(12) United States Patent
Shashank

(10) Patent No.: US 11,184,406 B1
(45) Date of Patent: Nov. 23, 2021

(54) SYSTEM AND METHODS FOR SECURE USER INTERFACE SESSION RECORDING, TRANSMISSION, AND REPLAY WITHOUT THIRD PARTY DISCLOSURE

(71) Applicant: Shashank, Sunnyvale, CA (US)

(72) Inventor: Shashank, Sunnyvale, CA (US)

(*) Notice: Subject to any disclaimer, the term of this patent is extended or adjusted under 35 U.S.C. 154(b) by 84 days.

(21) Appl. No.: 16/105,896

(22) Filed: Aug. 20, 2018

(51) Int. Cl.
*H04L 29/06* (2006.01)

(52) U.S. Cl.
CPC .......... *H04L 63/30* (2013.01); *H04L 63/0435* (2013.01); *H04L 63/0442* (2013.01)

(58) Field of Classification Search
CPC . H04L 63/30; H04L 63/0435; H04L 63/0442; H04L 65/403; H04L 67/02; H04L 69/329; H04L 67/04; G06F 11/3438; G06F 16/954; G06F 3/0481
See application file for complete search history.

(56) References Cited

U.S. PATENT DOCUMENTS

| | | | | |
|---|---|---|---|---|
| 6,418,471 B1* | 7/2002 | Shelton | ............... | G06F 11/3495 709/227 |
| 10,237,326 B1* | 3/2019 | Schwartz | ................ | H04L 67/22 |
| 2010/0145910 A1* | 6/2010 | Zhao | ................... | G06F 11/1658 707/620 |
| 2011/0296179 A1* | 12/2011 | Templin | ................ | H04L 9/0869 713/168 |
| 2015/0002619 A1* | 1/2015 | Johnston | ............... | H04L 65/607 348/14.12 |
| 2016/0112212 A1* | 4/2016 | Tabrizi | ................ | H04L 12/1822 715/756 |
| 2016/0266730 A1* | 9/2016 | Franke | ................ | G06F 11/3438 |
| 2016/0314303 A1* | 10/2016 | Johns | .................. | G06F 21/6209 |
| 2017/0185368 A1* | 6/2017 | Handrigan | .......... | G06F 16/9577 |
| 2019/0052613 A1* | 2/2019 | Karlsen | ................ | H04L 63/062 |

* cited by examiner

*Primary Examiner* — Chau Le
*Assistant Examiner* — Andrew Suh
(74) *Attorney, Agent, or Firm* — Diament Patent Law, P.C.; Adam Diament

(57) ABSTRACT

A user's session of a web application or a website in a web browser is recorded and replayed while protecting private and sensitive data from unauthorized access. All the captured data needed to re-create (replay) the user's session in the browser itself is recorded and exported on demand. The need to transmit potentially sensitive and private data continuously to external server(s) is eliminated while still guaranteeing availability of a record of user activity leading up to any point of interest during the user's session. By encrypting recording information and redacting all non-layout content (e.g. text nodes, images, inputs) from the browser DOM before capturing the DOM, the visual layout of the page is maintained and the probability of leaking the user's sensitive or private information is reduced. The replaying user is still able to derive meaningful information about the user's interaction with the web application or website without jeopardizing privacy.

15 Claims, 31 Drawing Sheets

RECORDER STORES RECORDING ON USER BROWSER
(ONE EMBODIMENT)

RECORDER STORES EVENT AND RESOURCE INFORMATION
IN RECORDER STORAGE OF FIRST DEVICE

```
class DOMMutationEventSource {
  private static DOM_MUTATION_OBSERVER_CONFIG: MutationObserverInit = {
    attributes: true,
    childList: true,
    characterData: true,
    subtree: true,
    attributeOldValue: true
  };

private mutationObserver: MutationObserver = null;

public constructor(private doc: Document, private sessionId: string, private windowId: string,
  private domNodeIdGenerator: any) {
    this.mutationObserver = this.setUpObserver();
  } public stop() {
    if (!!this.mutationObserver) {
      this.mutationObserver.disconnect();
    }
  } private setUpObserver(): MutationObserver {
    const domMutationObserver: MutationObserver = new MutationObserver(
      (mutationRecords: MutationRecord[], mutationObserver: MutationObserver) => {
        this.onDOMMutation(mutationRecords);
      }
    );
    domMutationObserver.observe(
      this.doc,
      DOMMutationEventSource.DOM_MUTATION_OBSERVER_CONFIG
    );
    return domMutationObserver;
  }
```

DOM MUTATION EVENT SOURCE

FIG. 12A

```
private onDOMMutation(mutationRecords: MutationRecord[]): void {
  const recapMutationRecords = mutationRecords.map((mutationRecord: MutationRecord):
any => {
    return {
      sessionId: this.sessionId,
      windowId: this.windowId,
      timestamp: Date.now(),
      targetId: this.domNodeIdGenerator(mutationRecord.target),
      eventType: getEventTypeForMutationRecord(mutationRecord),
      data: {
        textContent: mutationRecord.target.textContent,
        childNodes: mutationRecord.target.childNodes,
      }
    };
  });
  enqueueEventRecords(recapMutationRecords);
} private getEventTypeForMutationRecord(mutationRecord: MutationRecord): string {
  switch (mutationRecord.type) {
    case 'attributes':
      return 'DOM_MUTATION_CHARACTER_ATTRIBUTE';
    case 'characterData':
      return 'DOM_MUTATION_CHARACTER_DATA';
    case 'childList':
      return 'DOM_MUTATION_CHILD_LIST';
  }
 }
}
```

DOM MUTATION EVENT SOURCE

FIG. 12B

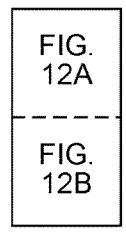

KEY TO
FIG. 12

```
const CapturedEvents: string[] = [
  'click',
  'input',
  'mousemove',
  'mouseup',
  'scroll',
];
class BrowserEventSource {
  public constructor(private win: Window, private sessionId: string, private windowId: string,
private domNodeIdGenerator: any) {
    this.setUpEventListeners();
  } private setUpEventListeners() {
    CapturedEvents.forEach((capturedEvent: string): void => {
      this.win.addEventListener(capturedEvent, (event: any): void => {
        enqueueEventRecords([{
          windowId: this.windowId,
          sessionId: this.sessionId,
          timestamp: Date.now(),
          targetId: this.domNodeIdGenerator(mutationRecord.target),
          eventType: 'BROWSER_EVENT',
          data: {
            eventType: event.type
          }
        }]);
      });
    });
  }
}
```

BROWSER EVENT EVENT SOURCE

FIG. 13

```
class ResourceTrackerEventSource {
  private readonly performanceObserver: PerformanceObserver;

public constructor(doc: Document, private sessionId: string, private windowId: string) {
    this.performanceObserver = new ((<any>self).PerformanceObserver)(
      this.handlePerformanceObserverEntries.bind(this)
    );
  } private handlePerformanceObserverEntries(entryList: PerformanceObserverEntryList): void {
    const entries: PerformanceResourceTiming[] =
<PerformanceResourceTiming[]>entryList.getEntries();
    const resourceURLs = entries.filter(entry => entry.initiatorType !== 'xhr').map(entry => {
      return entry.name;
    });
    const resourceFetchPromises = resourceURLs.map(resourceURL => {
      return fetch(resourceURL).then(urlContent => {
        return {
          url: resourceURL,
          content: urlContent
        };
      });
    });

Promise.all(resourceFetchPromises).then(fetchedResources => {
      const records = fetchedResources.map(fetchedResource => {
        return {
          windowId: this.windowId,
          sessionId: this.sessionId,
          timestamp: Date.now(),
          targetId: null,
          eventType: 'RESOURCE_REFERENCED',
          data: fetchedResource
        };
      });
      enqueueEventRecords(records);
    });
  }
}
```

RESOURCE TRACKER EVENT SOURCE

FIG. 14

```
class QueueProcessor {
  private static readonly FLUSH_INTERVAL_MS: number = 2048;

public constructor(recordQueue: Records[]) {
    setInterval(():  void => {
      this.flushQueue();
    }, QueueProcessor.FLUSH_INTERVAL_MS);
  } private flushQueue() {
    if (recordQueue.length == 0) return;
    const recordsToWrite = this.recordQueue.slice();
    this.recordQueue.length = 0;

recordsToWrite.forEach((recordToWrite: Record) => {
      if (recordToWrite.eventType == 'RESOURCE_REFERENCED') {
        this.writeResourceRecordToRecordsObjectStore(recordToWrite);
      } else {
        this.writeEventRecordToEventsObjectStore(recordToWrite);
      }
    });

} private writeEventRecordToEventsObjectStore(): Promise<void> {
    // Standard process of writing to Indexeddb
  } private writeResourceRecordToRecordsObjectStore(): Promise<IDBObjectStore> {
    // Standard process of writing to Indexeddb
  }
}
```

QUEUE PROCESSOR

FIG. 15

```
class DatabaseTruncator {
  public constructor(private dbName: string, private cleanupIntervalMinutes: number = 10) {
    setInterval((): void => {
      this.removeOlderRecords();
    }, cleanupIntervalMinutes * 60 * 1000);
  } private removeOlderRecords(): void {
    const now = Date.now();
    const maxSurvivorTime = Date.now() - this.cleanupIntervalMinutes * 60 * 1000;
    // standard processo of deleting records from Indexeddb based on the condition timestamp < maxSurvivorTime
  }
}
```

DATABASE TRUNCATOR

FIG. 16

PLAYBACK OPERATING IN SECOND DEVICE TO REPLAY
RECORDING FILE

```
class PlayerEventSource {
  public constructor(private eventDBName: string, private resourceDBName: string) {} public getDuration(): Promise<number[]> {
    // Use standarnd Indexeddb APIs to read the min and max timestamps stored in the events database
    const minTimePromise: Promise<number> = getMinTime();
    const maxTimePromise: Promise<number> = getMaxTime();
    return Promise.all([minTimePromise, maxTimePromise]);
  } public getEventsInInterval(minTime: number, maxTime: number): Promise<Record[]> {
    // Use standarnd Indexeddb APIs to read the all the records in the events database with timestamp >= minTime and
    // timestamp <= maxTime
  } public getResourceContent(resourceURL: string): Promise<Blob> {
    // Use standarnd Indexeddb APIs to read the record in the resource database with matching resourceURL
    // and return its resourceContent field.
  }
}
```

PLAYER EVENT SOURCE

FIG. 18

```
class DOMMutationEventReplayer {
  public constructor(private replayerDoc: Document, private playerEventSource:
PlayerEventSource) {

} public replayEventsInDuration(minTime: number, maxTime: number): void {
    this.playerEventSource.getEventsInInterval(minTime, maxTime).then((records: Record[]):
void => {
      records.forEach(record => {
        const target = record.targetId
          ? replayerDoc.querySelector('[target-id='+ record.targetId + ']')
          : replayerDoc.defaultView;
        switch (record.eventType) {
          case 'DOM_MUTATION_CHARACTER_ATTRIBUTE': {
            target.setAttribute(event.data.attributeName, event.data.attributeValue);
            break;
          }
          case 'DOM_MUTATION_CHARACTER_DATA': {
            target.textContent = event.data.textContent;
            break;
          }
          case 'DOM_MUTATION_CHILD_LIST': {
            target.innerHTML = event.data.innerHTML;
            break;
          }
        }
      });
    });
  }
}
```

BROWSER EVENT SOURCE

FIG. 19

```
class BrowserEventEventReplayer {
  public constructor(private replayerDoc: Document,
              private playerEventSource: PlayerEventSource,
              private fakeMouse: HTMLElement) {

} public replayEventsInDuration(minTime: number, maxTime: number): void {
    this.playerEventSource.getEventsInInterval(minTime, maxTime).then((records: Record[]):
void => {
      records.forEach(record => {
        const target = record.targetId
          ? replayerDoc.querySelector('[target-id='+ record.targetId + ']')
          : replayerDoc.defaultView;
        if (record.eventType !== 'BROWSER_EVENT') {
          return;
        } switch (record.data.eventType) {
          case 'input': {
            target.value = event.data.value;
            break;
          }
          case 'mousemove': {
            this.fakeMouse.style.position.top = event.data.eventY;
            this.fakeMouse.style.position.left = event.data.eventX;
            break;
          }
          case 'scroll': {
            target.scrollTop = event.data.scrollTop;
            target.scrollLeft = event.data.scrollLeft;
            break;
          }
        }
      });
    });
  }
}
```

BROWSER EVENT EVENT REPLAYER

FIG. 20

```
class ResourceProvider {
  public constructor(private playerEventSource: PlayerEventSource) {

} public getResourceForURL(resourceURL: string): Promise<Blob> {
    return this.playerEventSource.getResourceContent(resourceURL);
  }
}
```

RESOURCE PROVIDER

FIG. 21

RECORDER STORES RECORDING ON THIRD PARTY SYSTEM
(ANOTHER EMBODIMENT)

REGISTRATION

REQUEST ENCRYPTED PORTION OF RECORDING,
DECRYPT AND REPLAY

RECORDER COMMUNICATES RECORDING IN REAL TIME
TO ANOTHER BROWSER
(ANOTHER EMBODIMENT)

SYSTEM AND METHODS FOR SECURE USER INTERFACE SESSION RECORDING, TRANSMISSION, AND REPLAY WITHOUT THIRD PARTY DISCLOSURE

BACKGROUND INFORMATION

With the advancement in the underlying technology and the widespread adoption of the internet, user interfaces on the web have become increasingly sophisticated and complex. Evolving from static pages with largely textual content navigated using hyperlinks the web has now matured to provide rich, immersive user interfaces that pack a lot of interactivity and information and are developed and delivered as not just web pages, but as full-fledged web applications.

With the complexity and the increased usage, the need for developers and web application providers to understand how their users are using their products and the problems they may be running into has also increased. To meet this need, solutions have been developed that provide the web application provider a way to continuously record/capture their users' browsing sessions and store them on remote servers (typically owned and operated by a third party) so that they (the web application providers) can replay visually and analyze the user sessions at a later point in time. As an example, if a user encounters a bug while using the application and reports it, the developers can simply refer to the stored record of that session without forcing the user to describe (potentially inaccurately) the steps required to reproduce the bug. These solutions are also extended to provide a way to replay a user's browsing session in near-real time for the purpose of online help, support and customer service.

Unfortunately, one big drawback of this approach of continuously recording user browsing sessions and transmitting the data to external servers (typically third party) is the exfiltration of sensitive information (e.g. medical records, credit card details and other personally identifiable information), raising the concerns of identity theft and other fraud. While some session recording services provide tools to selectively redact content from recording, the dynamic nature of most of the complex web applications renders it largely ineffective because of the inherent difficulty in keeping the list of redacted content up to date with the changes in the web application/website.

SUMMARY

Embodiments of the invention provide novel systems and methods to capture and replay user web browsing sessions while eliminating the exposure of user data to third parties (where the first party is the user and the second party the web application provider or an affiliated entity) and minimizing the risk of leaking sensitive user data.

In one embodiment, the web application provider includes a piece of code (for example, written in Javascript) in their web application/website. This code, when initialized, using the APIs provided by the user's browser, continuously listens for notifications of events on the page including user interactions (e.g. click on a button, scroll to a certain location), modifications to the browser's DOM, network requests, browser console logs and style changes. For each of these events, it creates zero or more session record entries including the data necessary to re-play the event at a later point in time (for example, the timestamp of the event and mouse position for a mouse move event) and adds them to a database of such entries. The database of these entries may be stored in the volatile memory accessible to the web application or in non-volatile memory available to it including, but not limited to, indexedDB database(s), localStorage and web SQL database(s). The code may also capture the contents of resources linked to the main DOM document including, but not limited to, style sheets, images, and videos. If captured, these resource records are stored alongside the event records in the same type of storage or in disparate ones.

If the storage for the recording database(s) is limited, the code may truncate one or more parts of these databases including, but not limited to, periodically dropping old data from these databases such that at any point in time a record of a limited amount of immediate past in time is always available (for example, last 10 minutes).

The user of the web application/website is presented with an interface such that at any point in time, if they encounter a problem, including, but not limited to, a bug she/he uses the user interface to provide a bug report to the web application provider optionally including the content of the databases described above. The recorder database content is presented to the user as, among other means, a dynamically generated file that they download to their computer and make available to the web application provider via external means including email or a physical storage device transfer. The recorder database content may also, among other means, be directly transmitted to the web application provider from the web application itself. The recorder database content may also be embedded inside a dynamically generated HTML page (presented to the user) along with the replayer web application code (described below) to provide a one-click replayable version of the recorder database content.

The application provider is provided with a web application for the purpose of replaying the users' sessions. This web application is an independent application, may not be the same application that the user session occurred and was recorded on, may be loaded from an entirely different web server or from disk and does not need the recorded web application to be accessible to the application provider's browser at the time of the replay. On receipt of the content of the recorder databases as described above they provide the data to the aforementioned re-player web application (for example using the HTML5 File API) which includes code to parse the data and store it in the volatile memory accessible to the re-player web application or non-volatile memory available to it including, but not limited to, indexedDB database(s), localStorage and web SQL database(s) similar to the recorder. The data may be stored in a data structure conducive to look up by timestamp or resource URL.

The replayer web application presents the application provider with an interface that allows them to replay the events from the recorded session as included in the export of the recorder's databases in their own browser so as to visually reproduce the user's session.

To support linked resources including images and style sheets, the re-player web application may use an interception mechanism to trap the requests for linked resources and serve them from the database of captured resources. In one example, the interception mechanism uses the W3C Service Worker API that uses one or more service workers to intercept the requests for linked resources and serve them from the database of captured resources that may have been captured by the recorder as described above.

The recorded data may be encrypted in various ways using including, but not limited to, W3C Web Crypto API to protect undesired third-party access. In one embodiment, the application provider server or the target web application provides the recorder code with the public key of an asymmetric encryption key pair (e.g RSA) while keeping the private key private. The recorder code, in case it uses non-volatile memory provided by the browser including, but not limited to, indexedDB database(s), local Storage and web SQL database(s), encrypts the records it generates with the provided public key before writing them to the non-volatile memory. The recorder code may also, in addition, or independently, encrypt the recorder database(s) before presenting it to the user to be made available to the application provider in case of a problem as described above.

If encrypted, the replayer web application requests that the application provider provide the private key along with the contents of recorder database(s) at the time of replay. In one example, this is performed by pasting the private key in PKCS #8 format into an input box in the browser. The private key is then used to decrypt and recover the plain content of the recorder's database(s).

In yet another embodiment, a symmetric key is generated at runtime and used to encrypt recorder data as described above in the case of asymmetric key. In this case, the user is presented with the symmetric encryption key besides the contents of the recorder database(s) to be made available to the application provider in case of a problem as described above. In this embodiment, the replayer web application asks the application provider to supply the symmetric key generated by the recorder and passed to the application provider by the application user.

In another embodiment, the recorder code transmits the records it generates to a third party storage. In this embodiment, the application provider supplies the public key of an asymmetric key pair while keeping the private key private with which the recorder encrypts the records it generates before transmission. During replay, the replayer web application fetches the records of recorder database from the storage in the encrypted form, acquires the private key from the application provider and decrypts the records in the application provider's own browser before proceeding with the replay in the same fashion as described above. This ensures that the third party used for storage may not be able to access any sensitive user data that may be included in the records generated and transmitted by the recorder.

In yet another embodiment, the recorder transmits the records it generates to the application provider in real time. The transmission may be done over any transport including, but not limited to, HTTP, WebSockets, and WebRTC. To protect any sensitive data being captured by the recorder from a an eavesdropper the application provider provides the recorder with the public key of an asymmetric key pair while keeping the private key private used by the recorder to encrypt all the records it sends to the peer ensuring that the second party connected to it is able to access any sensitive data included in the records it generates only if it is the application provider (proven by access to the private key).

To further authenticate the peer on the other end of the communication channel purporting to be the application provider, the recorder may first send a randomly generated token encrypted using the public key as a challenge and send the recording data it generates only after the peer has proved that it is the application provider by proving that it has access to the private key corresponding to the public key by sending back the decrypted value of the aforementioned token.

Symmetric encryption may also be employed, with the user generating a random key at runtime and sending it over to the application provider interested in viewing their session replay in real time using any other trusted channel including, but not limited to, email and text messaging. Both parties then use the same shared secret key to encrypt and decrypt the data that they send and receive, respectively.

In another embodiment, to minimize the likelihood of leaking sensitive user data, the recorder code redacts non-layout content from the web application's DOM including, but not limited to, text nodes, input values, and images before generating its records. It further makes sure that the redaction does not break the layout of the DOM. As an example, this may be done by replacing the redacted content with randomly generated placeholder data including randomly generated text styled to have the same pixel dimensions as the original text and placeholder images styled to have the same dimensions as the original image.

Further details, embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIGS. 12A and 12B together form FIG. 12 which shows one embodiment of the DOM mutation event source mechanism of the first browser.

FIG. 13 shows one embodiment of the browser event source mechanism of the first browser.

FIG. 14 shows one embodiment of the resource tracker event source mechanism of the first browser.

FIG. 15 shows one embodiment of the queue processor mechanism of the first browser 902.

FIG. 16 shows one embodiment of the database truncator mechanism of the first browser.

FIG. 18 shows one embodiment of the player event source mechanism of the second browser.

FIG. 19 shows one embodiment of the browser event source mechanism 953 of the second browser.

FIG. 20 shows one embodiment of the browser event event replayer mechanism of the second browser.

FIG. 21 shows one embodiment of the resource provider mechanism of the second browser.

DETAILED DESCRIPTION

Figure 1:
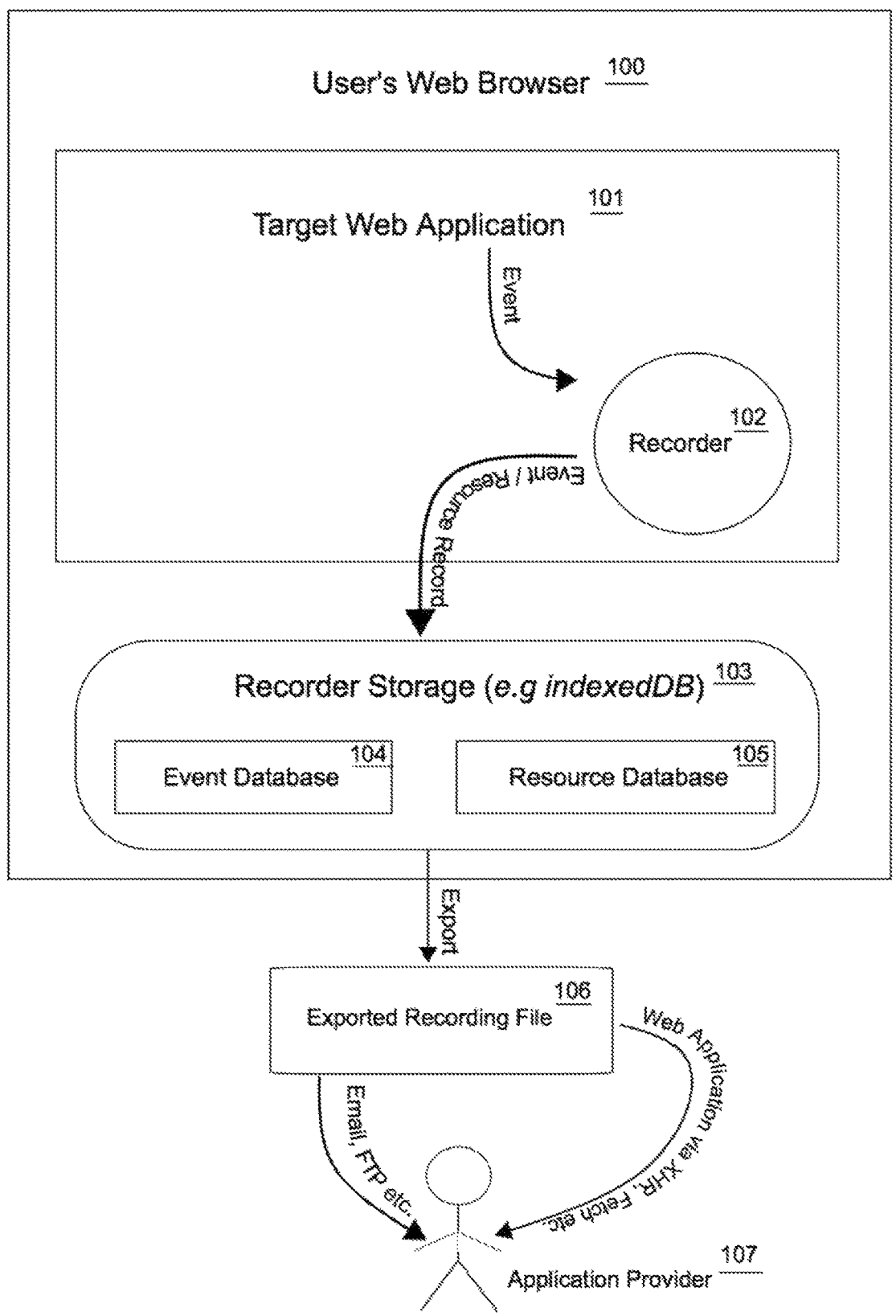
FIG. 1 illustrates the major components and their interactions on the user's computer.

Reference will now be made in detail to some embodiments of the invention, examples of which are illustrated in the accompanying drawings.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, electrical, and other changes may be made without departing from the spirit or scope of the present invention. The following detailed description is, therefore, not to be taken in a limiting sense, and the scope of the present invention is defined only by the appended claims.

Overview

The discussion is related to the field of delivering static or dynamic content to users over the internet (or within a smaller intranet) that is generally interpreted and displayed by application software installed by the end user on their computer commonly referred to as web browsers (e.g. Google Chrome, Mozilla Firefox, Microsoft Internet Explorer, Microsoft Edge, Safari). These web browsers interpret documents in standard languages and formats (e.g HTML, XHTML). For the purpose of visual enhancement, the browsers also interpret style descriptors in form of Cascading Style Sheets (CS S) or style descriptors embedded within the document itself. To allow the end user to interact with these documents the browsers also support scripting languages (e.g Javascript) that allow developers of the web content to define the behavior of parts of or the entirety of the document based on different types of events. These events include user actions (e.g. clicking on a part of the document), the passage of time and network event (e.g. data pushed from a server via Server Side Events sent over a network connection). Combined together these technologies provide businesses, developers, and others to deliver a rich, interactive, audio-visual interface to the users to interact with generally referred to as web pages or web applications.

The set of actions and events starting at the browser loading the document, including all or any user interactions with the document and resultant or independent mutations to the state of the document is generally referred to as a user/browsing session. A session may span multiple documents loaded over time with overlapping intervals or with time gap between them, This discussion in particular aspects is related to providing the ability to record all or part of the actions, events and related data in such a way that they may be used to recreate the session, visually or otherwise, at a different point in time in the future on the same computer or on a different one.

This is achieved by using one or more scripting languages supported by the browser (e.g. Javascript) to monitor the events to create a database of events describing the sequence of changes to the web page/web application state over time across the user session. The resulting list of events may then be re-executed/simulated on another device at another point of time in the future to recreate the user session.

For example, Javascript is used to listen for events emanating from the MutationObserver API to create a trail of changes to the DOM (Document Object Model) of the web page as it changes over time (e.g. removal of one piece of text and addition of another). Similarly, user interactions are listened to using standard browser APIs (e.g. movement of the mouse cursor over the page or the user typing in an input box). The events are captured as records along with the timestamp and other metadata. Following are a few examples of such records in JSON (Javascript Object Notation)

A record for a change in the content of a text node in the DOM:
{
"sessionId": "768d51a6-afb1-45ff-b83f-695365f727b8",
"windowId": "0bc731ba-1642-4883-b532-4a0ac0314a95",
"timestamp": 10000,
"eventType": "DOM_MUTATION_CHARACTER_DATA",
"targetId": "1024",
"data": {
"textContent": "You have been logged out"
}
}
A record for movement of the mouse pointer:
{
"sessionId": "768d51a6-afb1-45ff-b83f-695365f727b8",
"windowId": "0bc731ba-1642-4883-b532-4a0ac0314a95",
"timestamp": 10500,
"eventType": "BROWSER_EVENT",

```
"targetId": "2096",
"data":
    "eventType": "MOUSE MOVE",
    "x": 128,
    "y": 256
}
}
}
```

These records are then replayed on another computer (e.g. in another browser on the developer's computer) in the order in which they occurred on the user's computer to simulate the original user session. In the above example, during replay, the node with assigned id 1024 is located in the DOM 10 seconds after the initial page load has been simulated and its text content is programmatically changed to "You have been logged out" to simulate events as they happened in the user's browser. Similarly, after 10.5 seconds the mouse pointer (or a simulated version of it) is moved to the coordinates (128, 256) on the page to simulate the original user moving their mouse pointer during the session at 10.5 seconds after the page load. Note that the time scale during replay may be scaled. For example to speed up replay by a factor of 2 every record on the list is re-executed at half the time marker it was recorded at. For example, the text content change record is re-execute during replay at 5 seconds since the beginning of replay and the mouse move at 5.25 seconds). Likewise, the speed may be altered in the opposite sense as well by re-executing the records at longer intervals than they happened during the user's session.

DESCRIPTION OF SPECIFIC EMBODIMENTS

FIG. 1 shows the components involved in recording and storing the user session on the user's browser 100. The recorder 102 is loaded as a submodule in the web application 101 that is being used by the user and is the target of the recording. As the user uses with the application 101 events are generated that are captured by the recorder 102. These events include changes to the DOM and user interactions as described above.

A web page can link to resources that are fetched by the browser separate from the main document (for example images and external cascading style sheets). It is important to correctly capture and reproduce them for the replay to be accurate. It is also important to note that the browser executing the replay may not have access to the resources that the user's browser had access to. For example, a web server serving the web application/web page may use cookie-based authentication to store user-specific information (for example the user's profile photo on a social networking web application). Since the browser where the recording occurs may be different from the browser where replay occurs they may not share the authentication cookie. As a result, attempting to re-fetch the resource from the origin server during replay may result in error or display of incorrect data. To solve this problem the recorder 102 also tracks all the resources linked to by the DOM of the application being recorded (e.g. by tracking all the IMG elements in the DOM and downloading the linked images) and stores them as resource records alongside the event records as described above. Note that the download of the linked resource may be deferred until such time as the records store is being exported. These resources will be used during replay as described later.

In this embodiment the recorder stores the event records and the resource records in local storage provided by the browser 103 (e.g using the standard indexedDB API). The storage may be volatile (in-memory) as well. The event and resource records may be stored in separate databases 104 and 105 or they may be stored in the same database. If the amount of data generated by the user's use of the application in a long session exceeds the threshold of available or appropriate resource usage on the user's browser the recorder may choose to truncate records. For example, the recorder may use the timestamp associated with each record to drop/delete older records periodically, in effect, always keeping enough records to have the ability to replay the last N minutes of the user session, where N is a configurable parameter.

At any point in time during the user's session, the existing stored set of event and resource records may be exported as one or more files 106 containing enough data to allow the application provider 107 to recreate the user's session in another browser at any point of time in the future. These file(s) may then be transferred to the application provider 107 by any means including via email or physical transfer of a storage medium where the file(s) are stored. The recorder 102 may also transfer the file(s) 106 to the target web application 101 which could then transfer it to the web application server using networking APIs available to it (e.g XMLHTTPRequest or Fetch).

Figure 2:
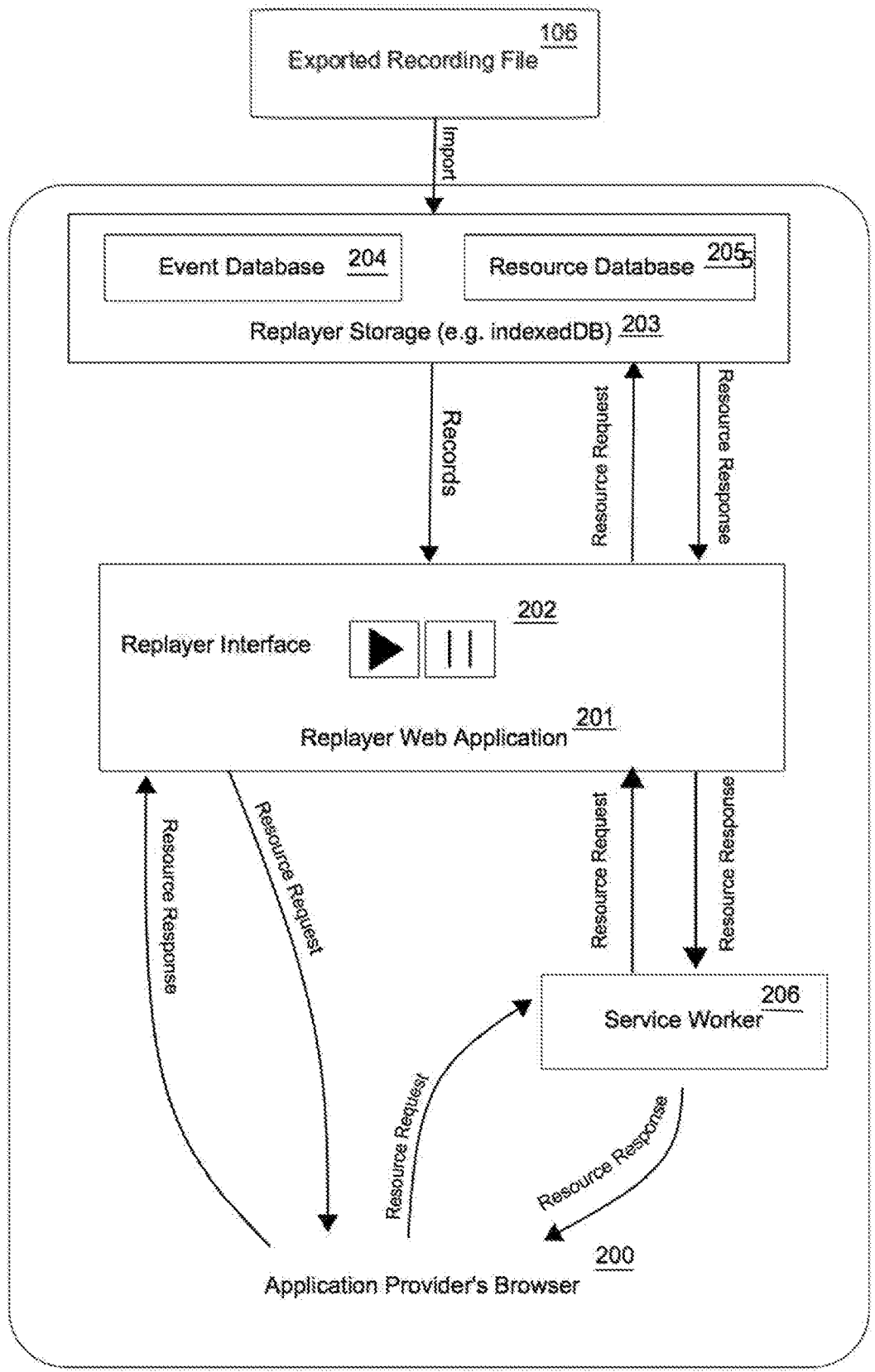
FIG. 2 illustrates the major components and their interactions on the application provider/replayer's computer.

FIG. 2 shows the components involved in replaying the recording file(s) 106 generated by the system shown in FIG. 1. As mentioned above, the replay happens on the application provider's 107 (or any entity affiliated with the application provider 107 that has the possession of the recording file(s), henceforth also referred to as the viewer) web browser. A special purpose web application 201 is loaded in the viewer's web browser. The recording file(s) 106 are then imported into the viewer's browser and stored using one of the storage APIs provided by the viewer's web browser (204, 205 similar to how it is stored in the user's web browser). The replayer web application 201 presents the viewer with a user interface with which to control the replay 202 (e.g. a play button to start the replay and a pause button to suspend it). Other elements in the interface may include tools to speed up or down the temporal rate of replay (as described above). When the viewer decides to start the replay the replayer web application fetches the event records from the store 204 and re-executes them in the viewer's web browser to simulate the events that occurred in the user's web browser, as described above. If the viewer pauses the replay, the process of re-executing the event records is suspended.

To handle the linked resources (e.g. images) as detailed in the sections above the replayer web application 201 may inject them into the replayer's mirror of the user's document. This injection process may be embedding the resource as data URIs in the DOM itself. To achieve better performance and better control the replayer web application 201 may use an interception mechanism, such as the Service Worker API to install a service worker 206 in order to intercept all the resource requests emanating from the replayer web application 201's mirror of the user's document. For example, if during the course of the replay a new IMG element is added to the DOM pointing to an image file (e.g. <img src="https://www.application-provider.com/images/profile.jpeg"/>) the viewer's browser 200 triggers a call to the service worker 206 installed by the replayer web application 201 passing it the URL of the image being requested (in this example "https://www.application-provider.com/images/profile.jpeg"). The service worker then sends a message to the replayer web application 201 (e.g via postMessage API) asking for the content of image at the URL. Since the recorder 102 tracks and captures all the linked resources, the replayer web application 201 finds the data corresponding the image identified by the URL and sends it back in the response to the service worker. The service worker 206 then serves the content of the image at the URL as captured by the recorder 102 to the DOM during the replay ensuring an accurate representation of what the user interface of the target web application 101 looked like when the user was using it. Note that the service worker 206 may also directly look up the content for the URL in the resource database 205 instead of proxying through the web application 201. One of ordinary skill in the art would appreciate that mechanisms other than the Service Worker API may be employed to perform the intercepting functionality.

It is possible that the recorder 102 may not be able to capture the linked resources. For example, this may happen if the resource files are served by a web server that doesn't allow the scripts in the target web application 101 to access the content of the resources via Access-Control headers. In such a case the lookup for linked resources in the resource database 205 may fail. The service worker 206 may, in this case, choose to return an error that is handled by the replayer web application 201 (e.g. using error event on IMG elements in the DOM). The replayer web application 201 may then replace the unavailable content with a placeholder preserving the layout of the page. The service worker 206 may also attempt to fetch the content of the URL from the server pointed to by the URL at the time of replay.

To ensure the security of the viewer's data it is also important to prevent the execution of any scripts that might be a part of the document during the user session when replaying the changes. Without this protection, a malicious user may create a recorded session data file with an embedded custom script that could read data from the viewer's browsers under certain conditions (e.g unsecured cookies) and exfiltrate it to a malicious web server. Execution of scripts can be prevented by, among other steps, removing all the <script> nodes when recording or before replaying and applying Content Security Policy (CSP) configuration preventing all inline script execution.

Figure 3:
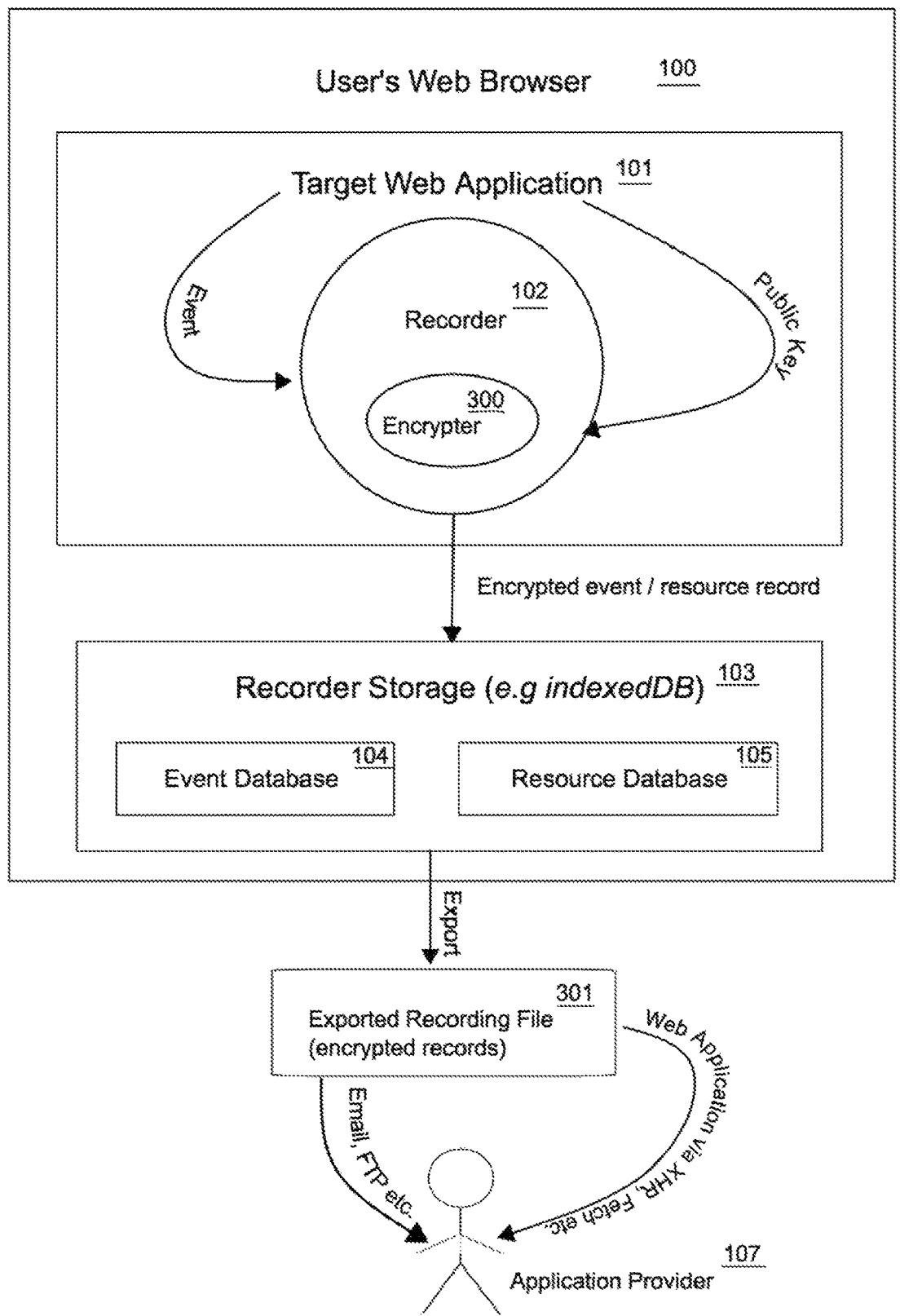
FIG. 3 illustrates the major components and their interactions on the user's computer when asymmetric encryption is employed.

FIG. 3 illustrates an embodiment of the invention where, to prevent undesired access to the data stored in the recorder database(s), the event and resource records are encrypted before being written out to the recorder storage 103. In the illustrated examples, the target web application 101 provides the public key of an asymmetric key pair (e.g based on RSA) to the recorder. The private key of the pair is kept safe by the application provider in such a way that it is only accessible to the entities with the authorization to access the user data that may be contained in the records captured by the recorder 102. The recorder has an encrypter submodule 300 that uses the web crypto APIs (crypto, msCrypto etc.) or any other implementation of public key based encryption to encrypt the records generated by the recorder before writing them to the recorder storage 103. Based on the principles of asymmetric cryptography which should be familiar to a person skilled in the domain as it forms the basis of security of a large part of the internet infrastructure (e.g in HTTPS), this mechanism guarantees that once encrypted it is prohibitively computationally expensive for anyone other than an entity in possession of the private key to be able to derive the plain content of the records generated by the recorder 102 as it was before it was encrypted. By the definition of private key only the second party (the application provider 107 or any other affiliated entity authorized by it by the means of allowing it access to the private key) is the only entity that has access to the private key thereby preventing any third party from accessing any user data that may be included in the records captured by the recorder 102.

As is the common practice, because of the inefficiency of asymmetric encryption on large messages the encrypter 300 may choose to generate a random symmetric key "K-Symmetric" at runtime in the browser using a Secure Pseudo Random Number Generator (SPRNG, e.g. SubtleCrypto.getRandomValues from the web crypto API) and encrypt the recorder 102's event and resource records with "K-Symmetric". To allow decryption using the private key during replay, "K-Symmetric" itself (which is a smaller value, typically 32-256 octets) is encrypted using the public key and stored in the recorder storage 103 along with the encrypted event and resource records (encrypted using the plain "k-Symmetric").

In the absence of a provided public key, the encrypter 300 may also choose to apply symmetric key encryption on the data in the recorder storage 103. The encrypter 300 generates a random symmetric key "K-Symmetric" and uses it to encrypt the event and resource records just as described above in the case of asymmetric encryption. However, since in this case, a public key is not available to securely embed "K-Symmetric" along with the recorder records it is held in memory until such time as export of the records occurs. Upon the export of the records in the store 103 that are encrypted with K-Symmetric, K-Symmetric itself is independently exported (e.g as a Base64 encoded token) and transmitted to the application provider 107 separate from the exported recording file(s) 301 as a "password" for to be provided during a future replay of 301.

The recorder 102 may also choose to not encrypt the records in the store 103 until export and apply any of the mechanisms described above only at the time of export of the records as the exported file(s) 301. It may also choose to apply any combination of when to encrypt and which encryption scheme to apply. The recorder 102 may also choose to use more than one value of symmetric or asymmetric encryption key to encrypt the data in the recorder store 103 during storage, upon export or both.

If some fields of the recorder records are needed to be accessible to the recorder 102 during recording (for example, the timestamp field for the purpose of periodic truncation) the encrypter 300 may choose to keep them accessible to itself during recording. This may be achieved, for example, by not encrypting these fields at all or by copying them into an unencrypted section of the record. The encrypter 300 may then re-encrypt these fields or drop them before exporting as file(s) 301.

Upon export, the encrypted recording file(s) 301 are transferred to the application provider 107 in the same way as in the unencrypted case described earlier. Additionally, in the case of symmetric encryption, the exported key "K-Symmetric" is also transferred to the application provider 107 using the same or a different method as the recording file(s) 301.

Figure 4:
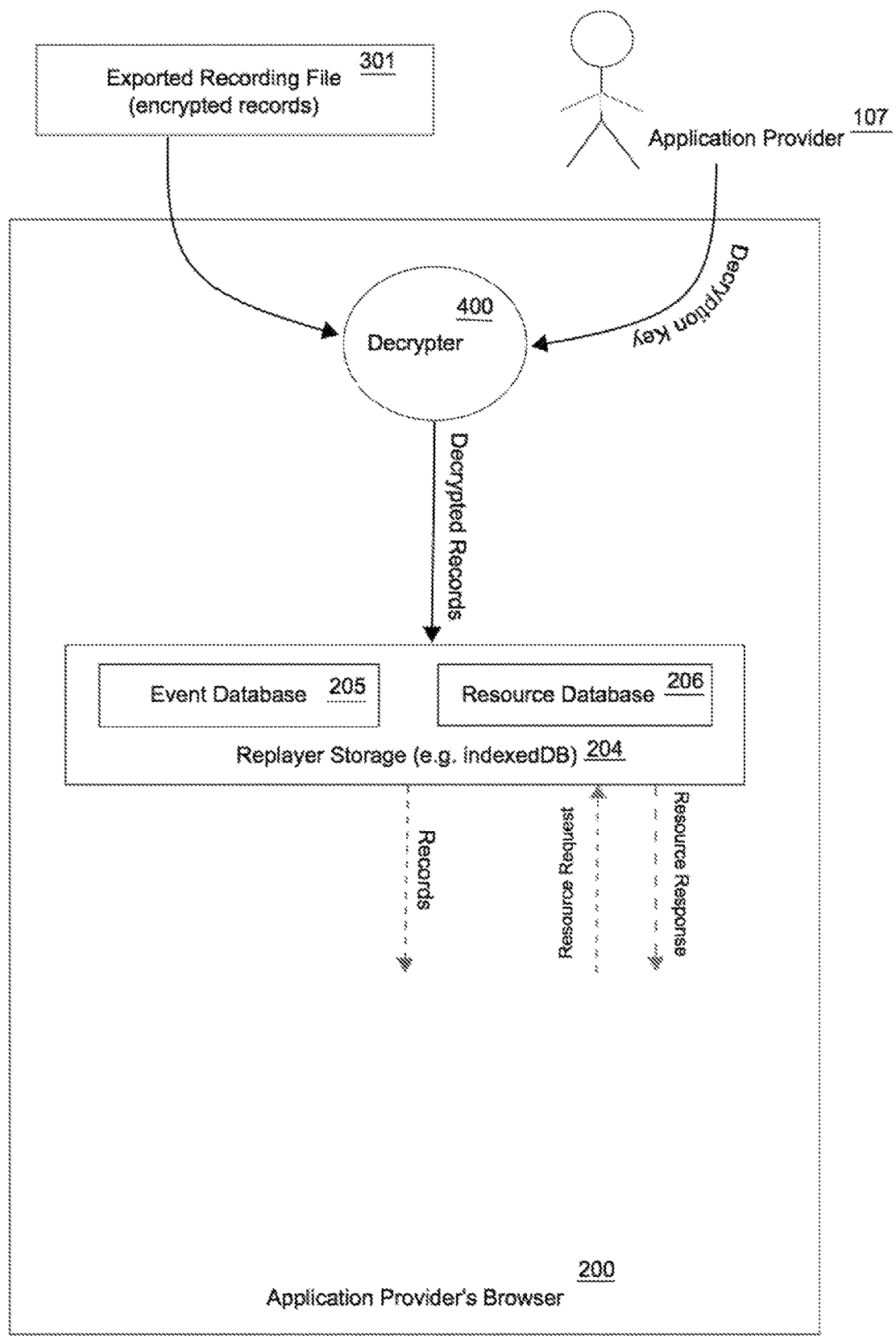
FIG. 4 illustrates the major components and their interactions on the application provider/replayer's computer when asymmetric or symmetric encryption was employed to create the recording that is being replayed.

FIG. 4 illustrates the components used to replay recording file(s) 301 created by the system illustrated in FIG. 3 in application provider's web browser 200. The application provider, upon receipt of the recording file(s) 301 loads the special purpose replayer web application 201 that has an additional decrypter module 400. In addition to the encrypted recording file(s), 301 the application provider (henceforth aliased as the viewer) also provides the correct decryption key(s) corresponding the encrypted recording file(s) 301. Depending on how the encrypted recording file(s) 301 were encrypted this may be one or more asymmetric encryption private keys or symmetric encryption "passwords" or a mix thereof. The decrypter 400 then uses the provided decryption key(s) to decrypt the records contained in the file(s) 301. The decrypted (plain) records may then be processed similarly to the method illustrated in FIG. 2.

The decryption might also be deferred until the first read, for example, by decrypting only a part or nothing of the records before storing them in the replayer storage 204 and decrypting fully only when the replayer web application 201 requests the record for the purpose of replay. Such a deferred decryption may require special type of encryption where less sensitive part of the records (e.g the timestamp) are encrypted separate from the more sensitive parts (e.g. the textual data in the DOM mutation records) allowing the less sensitive data to be eagerly decrypted before storage in 204 while delaying the decryption of more sensitive data until absolutely necessary.

Figure 5:
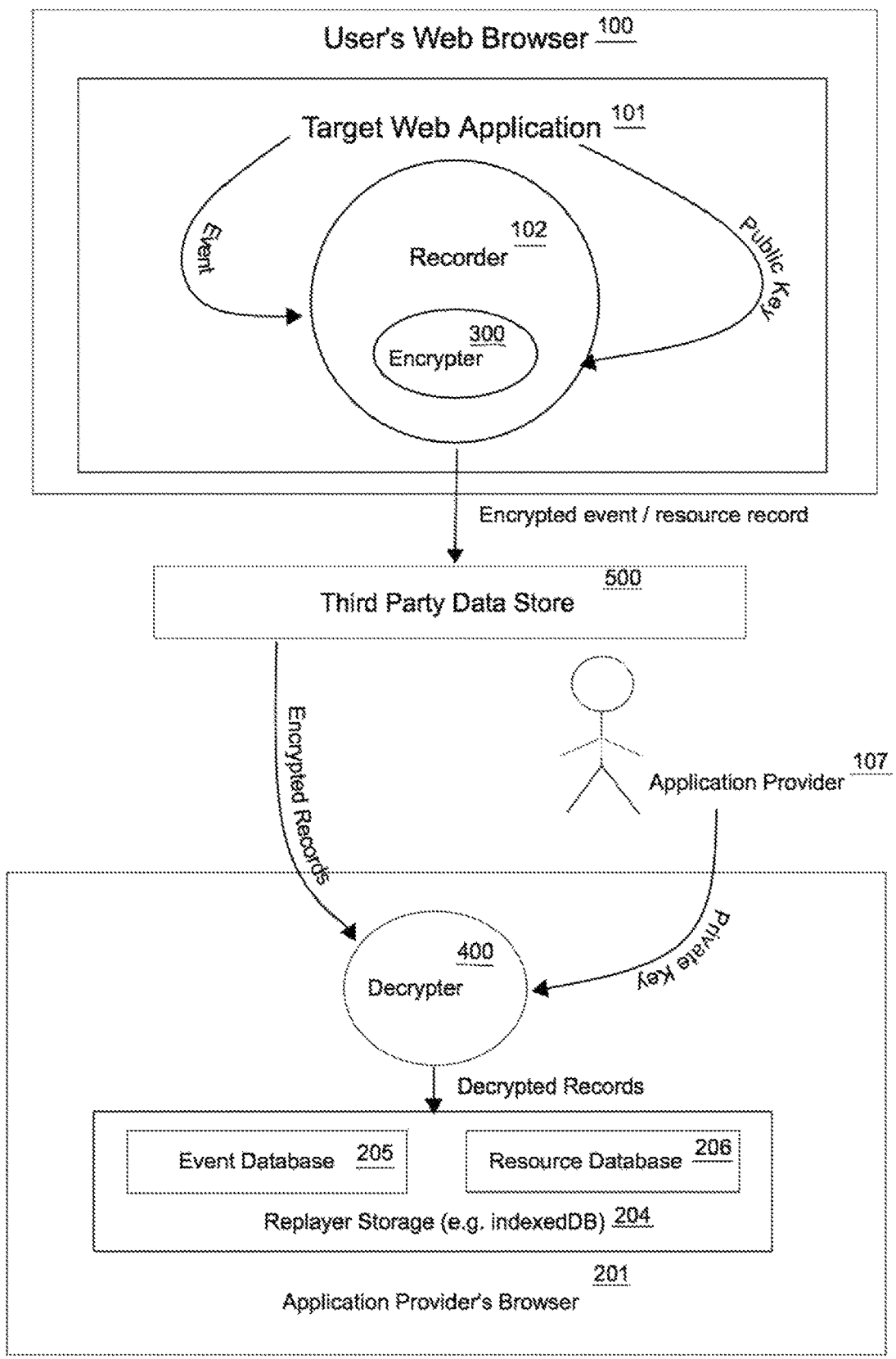
FIG. 5 illustrates the major components and their interactions on the user's computer, the third party storage and the application provider/replayer's computer when the recording is stored on a third party storage.

FIG. 5 illustrates an embodiment of the invention that allows storing the recorder records on a third party data store 500 without exposing any sensitive user data that might be included in these records thereby providing the convenience of a third-party data storage without compromising the privacy of the user. In this embodiment, the records are transmitted to a third party server as they are generated by the recorder 102. The records may be individually transmitted to the third party server or in batches of more than one. Similar to the embodiments described above the generated records are encrypted using symmetric or asymmetric encryption before transmission to the third party server. In case of asymmetric encryption the private key, by definition is not accessible to the third party. In case of symmetric encryption the symmetric key used in never transmitted to the third party server and is instead passed to the web application server or the target web application 101 to be stored at its discretion. This guarantees that even though the third party has access to the records generated by the recorder 102 which may contain sensitive user data it is computationally infeasible for the third party to read the plain content of these records. The third party storage in this embodiment may also be replaced by a second party storage that doesn't share the same encryption keys as the target web application 101.

The replaying mechanism of this embodiment is similar to the one illustrated in FIG. 4. The application provider 107 provides the appropriate decryption key(s) and the records are fetched from the third party storage in their encrypted form. The records are decrypted on the application provider's (henceforth aliased as the viewer) browser, never exposing the plain, decrypted form of the records and the data therein to the third party storage. The rest of the setup is similar to the embodiment illustrated in FIG. 4.

Figure 6:
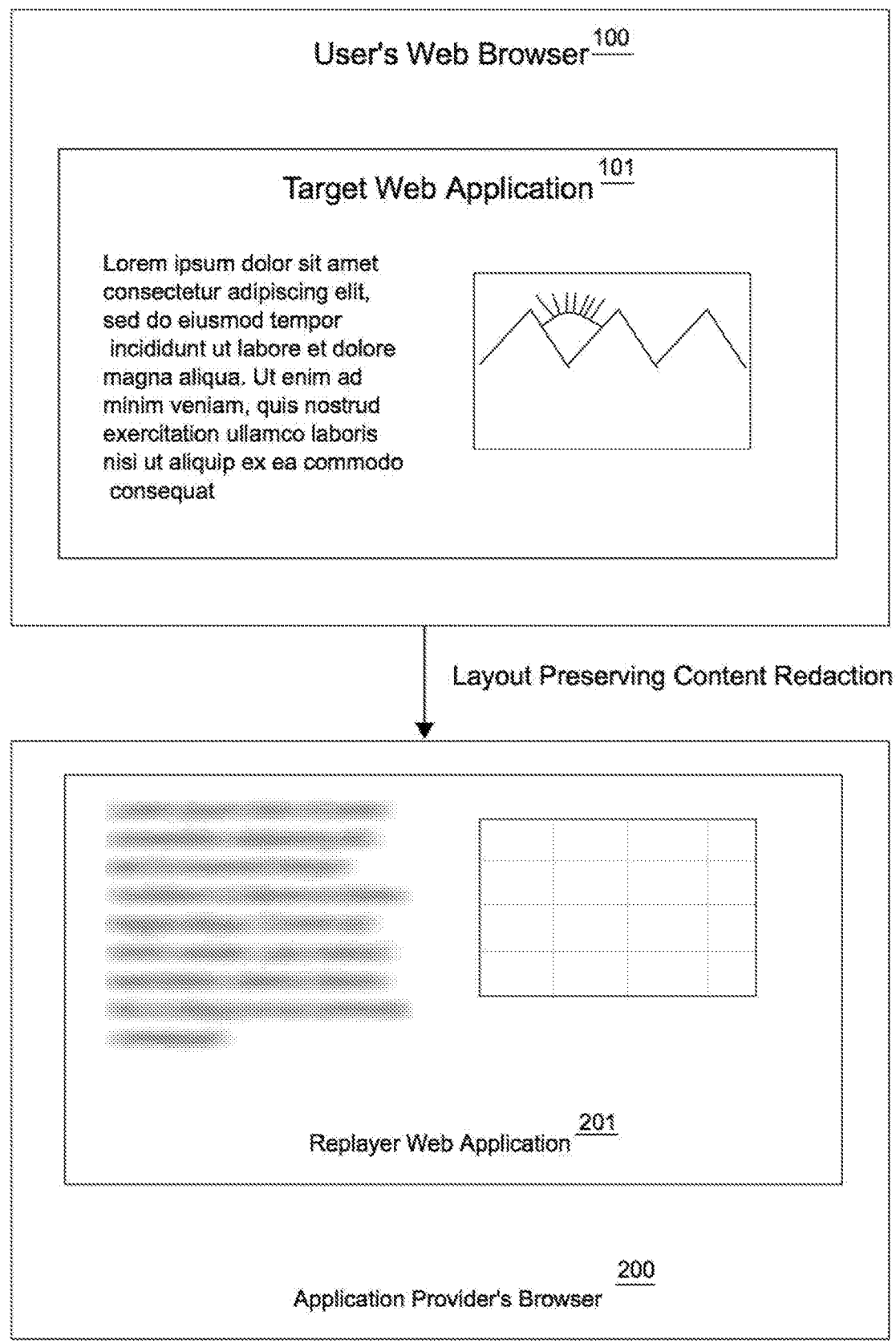
FIG. 6 illustrates automatic content redaction with preservation of layout of the original web page user interface.

FIG. 6 illustrates an embodiment that limits the likelihood of leaking sensitive user data along with recorder records by redacting content from the document before capturing the data for them while preserving the visual layout of the document. Since for the vast majority of web application the set of visual layouts is fixed and/or much smaller than the set of all possible combination of content in the document, this may still allow the application provider 107 to derive significant useful information about the user's use of the target web application 101's user interface without ever recording sensitive user data in the content in the document. The set of DOM nodes that are considered content and redacted as described above includes, but is not limited to, text nodes, images, videos, audio, and canvas).

Images, videos, audio, and canvas may be redacted by not capturing their content at all. Since they are considered "replaced" elements their content is not a part of the DOM and as a result, is not included in any DOM Mutation events. For examples, to redact images linked to the main document via URLs, the recorder 102 creates an empty resource record for them. As explained in the description of FIG. 2, this will cause the service worker 206 to return an error for the images during replay, the replayer application 201 will detect the error using the "error" event on the images and replace the images with a placeholder of the same dimensions as the real image thereby preserving the layout of the document while redacting the content of the image.

The textual content of the document is redacted by replacing the real content of all CharacterData nodes of the DOM by dummy content that may be randomly generated. The recorder 102 doesn't capture the real content of the CharacterData nodes during recording. Instead, it records the bounding boxes of the nodes as laid out at the time of recording. During replay, the replayer web application 201 generates random replacement data for these nodes ensuring that the generated random replacement data has the same bounding box given any Cascading Style Sheet (CS S) rules that might be applicable. The replayer web application 201 may also use visual tools like blurring, pixelation, paint-over or transparency to hide the randomly generated replacement data and simulate an effect of physical redaction. As an alternative, the generation of random replacement data might occur during recording itself (done by the recorder 102).

To redact any sensitive data that may be part of the attributes of DOM nodes (e.g. URL parameters in an image URL, <img src="https://social-networking.com?email=useremail@host.com">) the recorder 102 may also strip all the URL parameters, usernames and passwords from all the URLs in the DOM before creating event and resource records. The recorder 102 may also choose to replace entire URLs or parts thereof in DOM attributes by random/dummy values or secure or unsecure digests (e.g. MD5, SHA256) of the URL. Any resource records created for such URLs may be created for the replacement URLs. If the service worker 206 is used it will intercept all network requests, including the ones for the replacement URLs and correctly serve captured resource (or error in case of redaction of content pointed to by the URL) for them.

Figure 7:
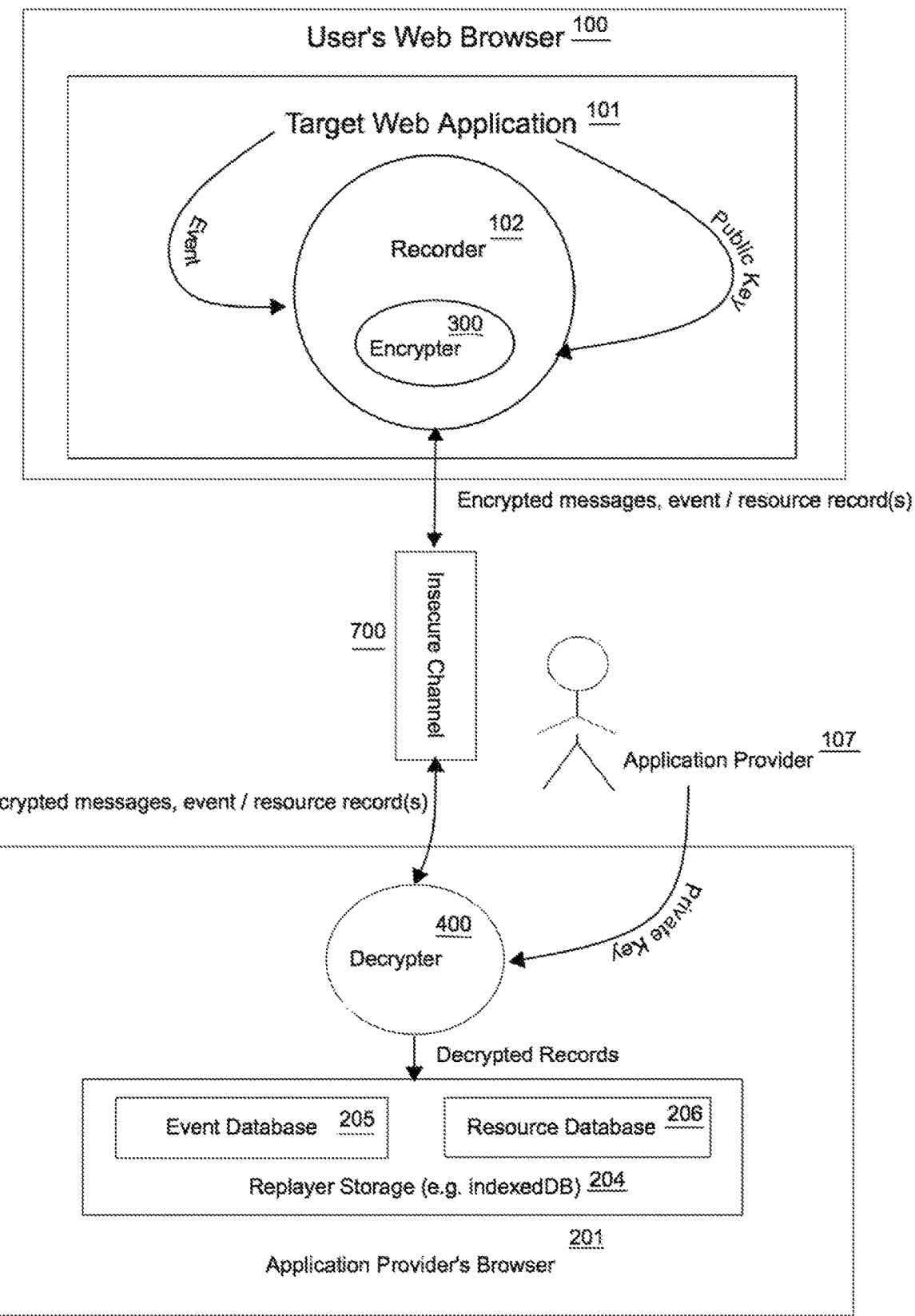
FIG. 7 illustrates the major components and their interactions on the user's computer and the application provider/replayer's computer when the recording is transferred and replayed near real-time.

FIG. 7 illustrates an embodiment of the invention that allows secure replay of a recording in near-real-time using any insecure channel of communication 700 (e.g. using webRTC) between the user's browser 100 and the application provider (henceforth aliased as the viewer)'s browser 201. The recording setup on the user's browser 100 is similar to the one illustrated in FIG. 3. In this embodiment, the recorder 102 on the user's browser 101 either transmits them to the viewer's browser 201 immediately upon creation or stores them in recorder storage 103 before transmitting them in small batches (to increase efficiency). Asymmetric or symmetric encryption may be applied similar to the embodiments described earlier to encrypt the recorder event and resource records before transmission to ensure that no third party may have a computationally feasible way to extract any sensitive user data that might be captured as a part of the transmitted records even if they are able to eavesdrop on the medium used to transmit the data.

On the viewer's browser 201 the decrypter 400 receives the appropriate key(s) needed to decrypt the records being received of the communication channel from the viewer 107. As described in earlier embodiments these key(s) may be private key(s) of pair(s) of asymmetric keys the public key part(s) of which were used for encryption on the user's browser 100. They may also be symmetric keys (or "passwords") provided to the viewer 107 using a separate, trusted channel of communication or using a temporary secure channel created using pair(s) of asymmetric key(s) as described later in FIG. 8. The decrypter 400 then decrypts the incoming records using the provided keys and uses them to replay the user session in near-real-time (i.e. with small delays caused by the latencies added by the processing on the user's browser 100, the delays involved in transmission of the records and the time take to process them on the viewer's browser 201 before the records may be re-executed on the viewer's browser 201).

The insecure channel of communication may be a one way or two-way channel set up using technologies such as Peer to Peer (P2P) webRTC's RTCDataChannels or two HTTP or Web Socket connections connecting the two parties via a relay server. This channel of communication may be insecure by not preventing a third party from eavesdropping on the communication between the two parties possibly using a Man In The Middle (MITM) attack. Since in this embodiment any data being transmitted by the user's browser 100 is always encrypted in such a way (as described above) that even if the MITM is able to collect the encrypted messages on their way to the viewer's browser 201 (or messages going the other way from the viewer's browser 201 to the user's browser 100) it is computationally infeasible for them to extract any sensitive user data that might be contained in them, the user data being transmitted is guaranteed to be secure from third party access.

The aforementioned channel of communication may also be used to exchange messages between the users using the two browsers to enable better communication during the near real time replay. The messages may include plain text, images and on-screen drawing using pointer devices (e.g a mouse).

Figure 8:
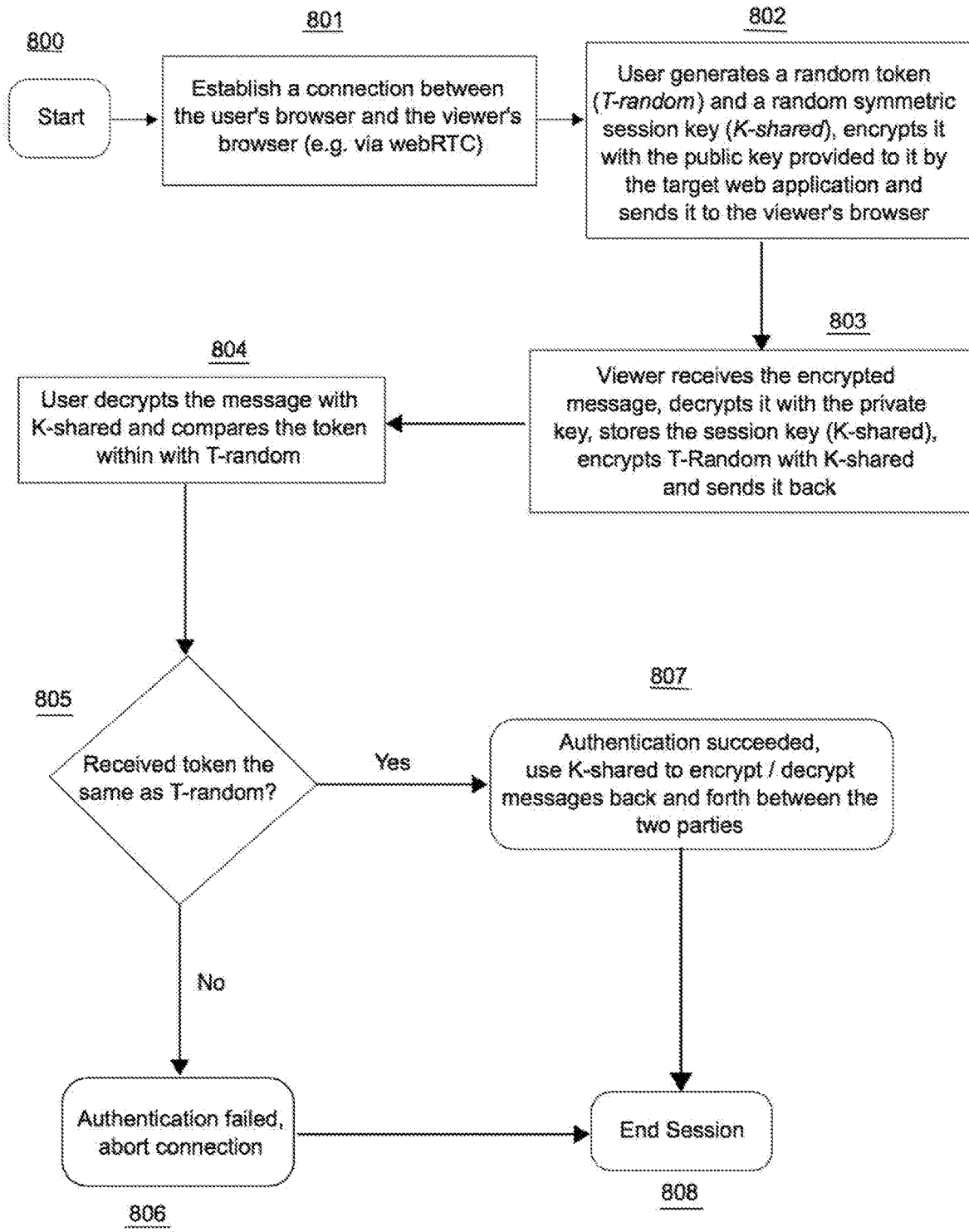
FIG. 8 is a flowchart illustrating the algorithm to establish a secure two-way channel of communication between the user and the application provider/replayer's browsers on top of an insecure channel for the purpose of near-real-time record and replay according to specific embodiments.

FIG. 8 is a flowchart describing an algorithm that allows the two parties, the user and the viewer, to establish short-term shared symmetric keys to encrypt the communication if using asymmetric encryption is inefficient or secure two way communication is desired (e.g. to exchange textual messages between the two parties). In step 801 a two way, potentially insecure communication channel is established as described above. In the next step 802 the recorder 102 generates two random values, an encryption key that will be available to both the parties (K-Shared) and a token (T-Random) that will be used to verify that the entity on the other end of the insecure channel is the application provider 107 proved by the entity's access to the private key corresponding the public key provided to the recorder 102 by the target web application 101. The recorder 102 creates a message containing both these randomly generated values, e.g.

{
"sharedKey": "5fe4cc298200 . . . ",
"verificationToken": "ade71cbaa2ea . . . "
}

The recorder 102 then encrypts this message with the public key provided to it and transmits the encrypted message over the insecure channel 700 to the second party purporting to be the application provider 107. In step 803 the second party receives the encrypted message and decrypts it using the private key available to it. If the second party doesn't have access to the private key they will not be able to decrypt the message to extract the values of the tokens. If the second party is indeed the application provider 107 it creates a new message with decrypted T-random, e.g.

{
"verificationToken": "ade71cbaa2ea . . . "
}

The application provider 107 then encrypts this message with the shared key (K-Shared) that arrived in the first message it received and transmits it back to the recorder 102. In the next step 804, the recorder 102, upon receipt of the response, decrypts it using the K-Shared it generated in step 802. It then compares the value of verification token in the message with the T-Random value it generated in step 802. If the verification token is not the same as T-Random, the recorder 102 assumes that the second party doesn't have access to the correct private keys, is not the application provider 107, is malicious, aborts the connection and stops. If the verification token matches the value of T-Random the recorder 102 concludes that it is indeed communicating with the application provider 107. At this step 807, both the parties, the recorder 102 and the decrypter 400 on the application provider's browser 201 have access to the symmetric shared session key K-Shared which both use to encrypt and decrypt the messages they send and receive, including the recorder event and resource records sent by the user to application provider thus establishing a secure two way communication channel between the two parties.

Figure 9:
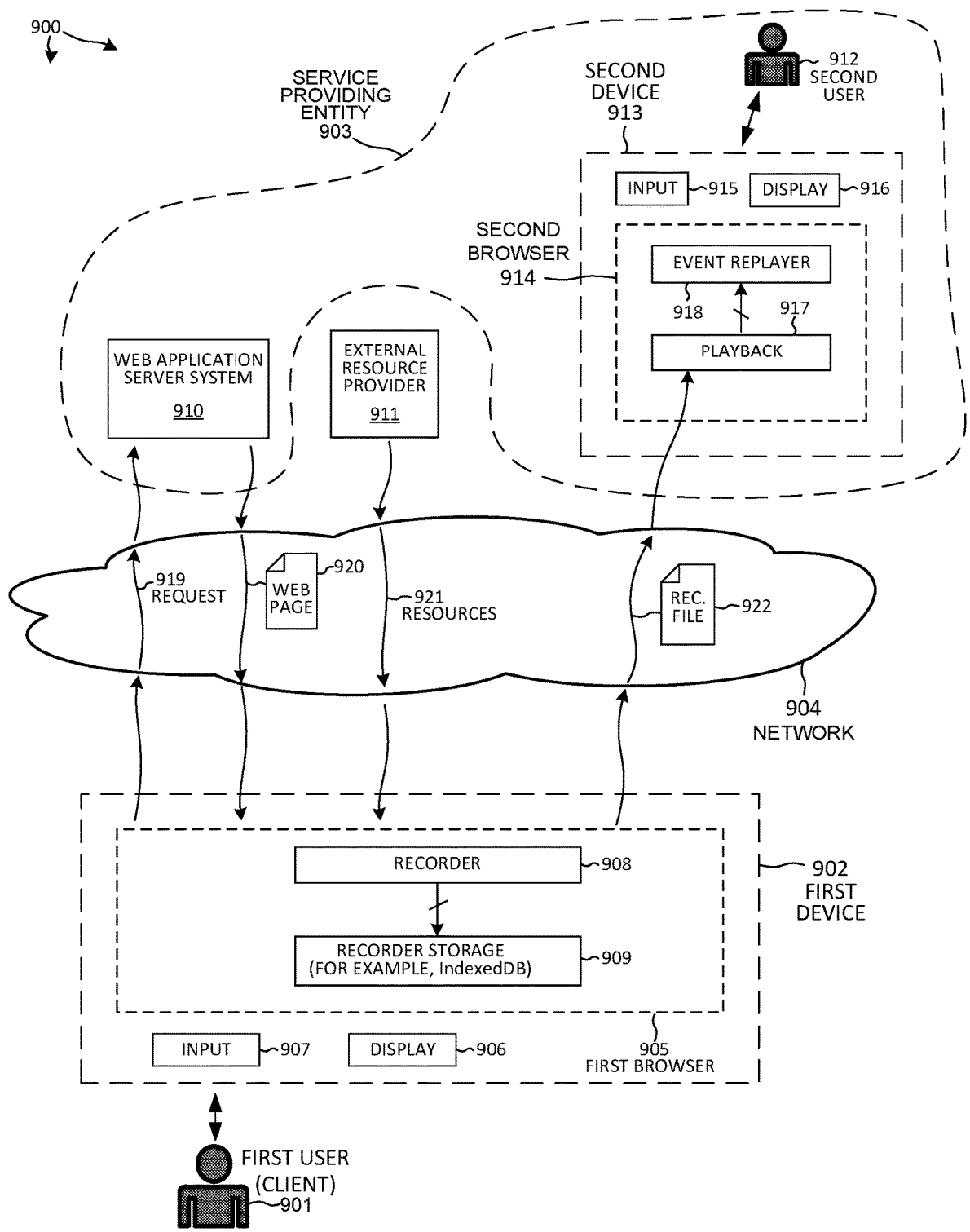
FIG. 9 is a diagram of a system where a session is recorded on a first browser and replayed on a second browser in accordance with one embodiment.

FIG. 9 is a diagram of a system 900 where a session is recorded on a first browser 905 and replayed on a second browser 914 in accordance with one embodiment. System 900 comprises a first device 902 operated by a first user 901, a network 904, a service providing entity 903, and an external resource provider 911. The first device 902 comprises the first browser 905 running on the first device 900, a display 906 and an input mechanism 907. The first device 900 is a network enabled device that accesses a web page or a web application from server providers across a network. The first user 901 interacts with the first browser 905 presented on display 906 via input 907. The first user 901 is a client of service providing entity 903 and accesses web pages or web applications provided by the service providing entity 903 across network 904 using the first device. The first browser includes a recorder 908 and a recorder storage 909. The recorder 908 is configured to record a session and store the recorded session in recorder storage 909.

The service providing entity 903 comprises a web application server system 910 and a second device 913 operated by a second user 912. The second device 913 comprises a second browser 914, input mechanism 915 and display 916. The second user 912 interacts with the second browser presented on display 916 via input 915. The second user is part of service providing entity 903 and is trusted with session information of first user 901. In one example, the second user 912 is an employee of the service providing entity 903. One job function of employee 912 is to review sessions of the first user 901 to assist in improving the service provided by the service providing entity 903. For example, employee 912 may want to review sessions of first user 901 to identify where applications crash or to understand application features that are inefficient or challenging to use. The second browser 914 includes a playback 917 and an event replayer 918. The event replayer 918 receives session information from playback 917 and replays sessions on second browser 914 with or without accessing any information from the service providing entity 903 or from external service provider 911.

In the embodiment of FIG. 9, the external resource provider 911 is part of system 900 and is involved in displaying the web page on the first device 902. The external resource provider provides additional resources, such as source code files, image files, stylesheets, audio files, or video files, requested by web page 920. In another embodiment, no external resource provider 911 is included in system 900 and the web application server system 910 provides all necessary resources involved in serving the web page 920 to the first browser 905.

In operation, the first user 901 accesses services provided by web application server system 910 by entering a URL into the first browser 902 using input 907. In response, the first browser 902 communicates a GET request 919 that is received onto web application server system 910. The web application server system 910 responds by providing access to the service via a web page or web application. In this example, the service is presented in web page 920. In other examples, the service is presented as multiple web pages, a single page application, or one or more web pages that change dynamically. Web page 920 is loaded on the first browser 905 thereby initiating a session. Web page 920 obtains additional resources 921 from the external resource provider used to render the web page 920 on the display 907. These additional resources 921 include stylesheets, source code such as javascript, images, videos, or other content involved in loading the web page 920.

During the session, events occur on the web page 920. The recorder 907 stores all events in the recorder storage 908 and all resources associated with the events in the recorder storage 909. Some events may occur in response to input from the first user 901. For example, the first user 901 may move a selector, touch/click on buttons, enter text/voice/video, or provide any type of input that is detected by the first browser 905. Other events occur in response to scripts included in the web page. For example, the web page 920 may have an embedded script that is to update DOM in some fashion at a predetermined interval of time. Such events that do not involve input from the first user 901 are part of the session and are recorded by recorder 907.

Next, the first user 901 determines that the session is to be shared with the service providing entity 903. The first user 901 communicates a recording file 922 to the second browser 914. The recording file 922 comprises session information associated with the session. The recording file 922 is encrypted using asymmetric or symmetric encryption as explained above. The playback structure 917 receives the recording file 922, extracts the session information, and supplies the session information to the event replayer 918. The event replayer 918 replays the session on the second browser 914 which is rendered on display 916 to the second user 912. In one example, the second user 912 provides feedback based on the replayed session to other members of the service providing entity 903. The feedback is valuable in modifying or improving the service.

In accordance with at least one novel aspect, the event replayer 918 replays the session on the second browser 914 without accessing any external resources. The event replayer 918 replays the session on the second browser 914 without requesting any of the resources 921 from the external service provider 911. The session is replayable by event replayer 918 even when the second device 913 has no network connectivity and is completely isolated from any other device or network, such as network 904.

Figure 10:
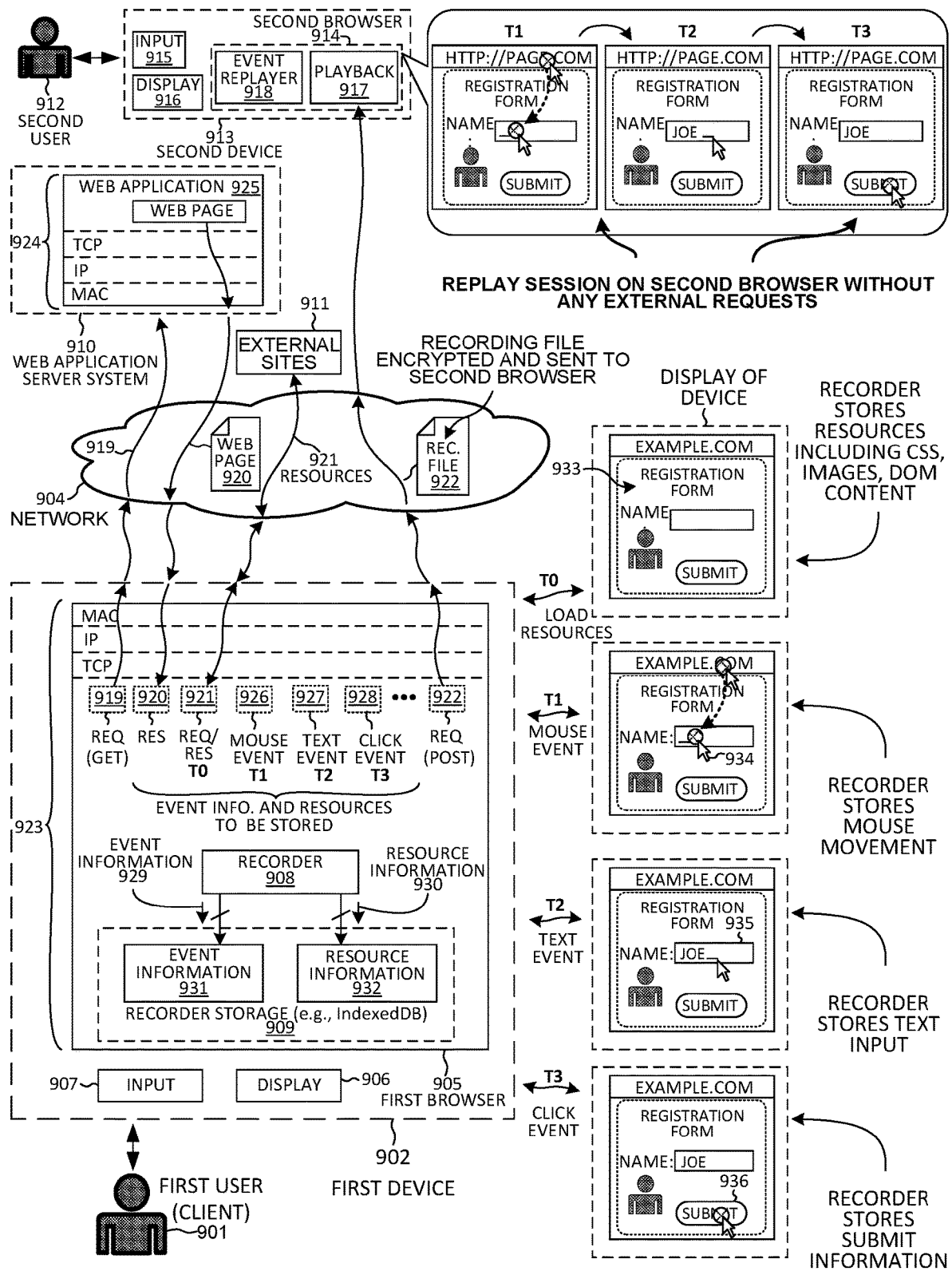
FIG. 10 is a detailed diagram showing how a session is recorded and stored on the first device and replayed on the second device in the example of FIG. 9.

FIG. 10 is a detailed diagram showing how a session is recorded and stored on the first device 902 and replayed on the second device 913 in the example of FIG. 9. In this example, the service providing entity 903 operates and provides the "EXAMPLE.COM" service and the first user 901 is registering with the "EXAMPLE.COM" via the web page 920 that is presented on the display 906. An artisan of ordinary skill in the art will appreciate that this is but one example presented here for explanatory purposes and that sessions to be recorded often involve substantial content and complexity. The first user client 901 accesses the service by causing request 919 to be communicated to the web application server system 910 across network 904. In this example, request 919 is an HTTP GET type request. Reference numeral 923 identifies a network stack on the first device 902 involved in communicating with the web application server system 910. A web application 925 is running on the web application server system 910. The web application 925 receives GET request 919 and responds by communicating the response 920 to the first browser 905 via the network 904. In this example, the response 920 is a web page that is renderable on the display 906 of the first device 902.

At time T0, the first browser 905 detects that web page 920 requires additional resources 921 in rendering the web page 920. The first browser 905 requests the additional resources 921 from external sites 911 across network 904. The web page is rendered on the display 906 and presents a "REGISTRATION FORM" 933 to the first user 901.

At time T1, the first user 901 moves a selector 934 across the display 906. This is detected by the first browser 905 as a mouse event. Reference numeral 926 identifies this mouse event. The recorder 908 stores the mouse event 926 in recorder storage 908.

At time T2, the first user 901 enters his/her name into a text field element 935. This is detected by the first browser 905 as a text event. Reference numeral 927 identifies this text event. The recorder 908 stores the text event 927 in recorder storage 908.

At time T3, the first user 901 selects the "SUBMIT" button 936 to submit the form to the web application 925. This is detected by the first browser 905 as a click event. Reference numeral 928 identifies this click event. The recorder 908 stores the click event 928 in recorder storage 908.

Recorder 908 stores event information 929 and resource information 930 in the recorder storage 909. The event information 929 comprises all of the events detected by the first browser 905. The resource information 930 comprises the resources 921 as well as additional resources received throughout the session. The various states of the DOM including information received onto and sent from the first browser 905 are part of the session that is recorded.

Next, the first user 901 decides to share the session information with the service providing entity 903. A recording file 922 that stores the session information is encrypted and communicated across network 904 to the second device 913. The playback mechanism 917 receives the recording file 922, decrypts the recording file 922, extracts the session information, and supplies the session information to the event replayer 918. The event replay 918 receives the session information and replays the session on the second browser 914. As shown in FIG. 10, the second user 912 is shown the session including events at time T1, time T2 and time T3.

Figure 11:
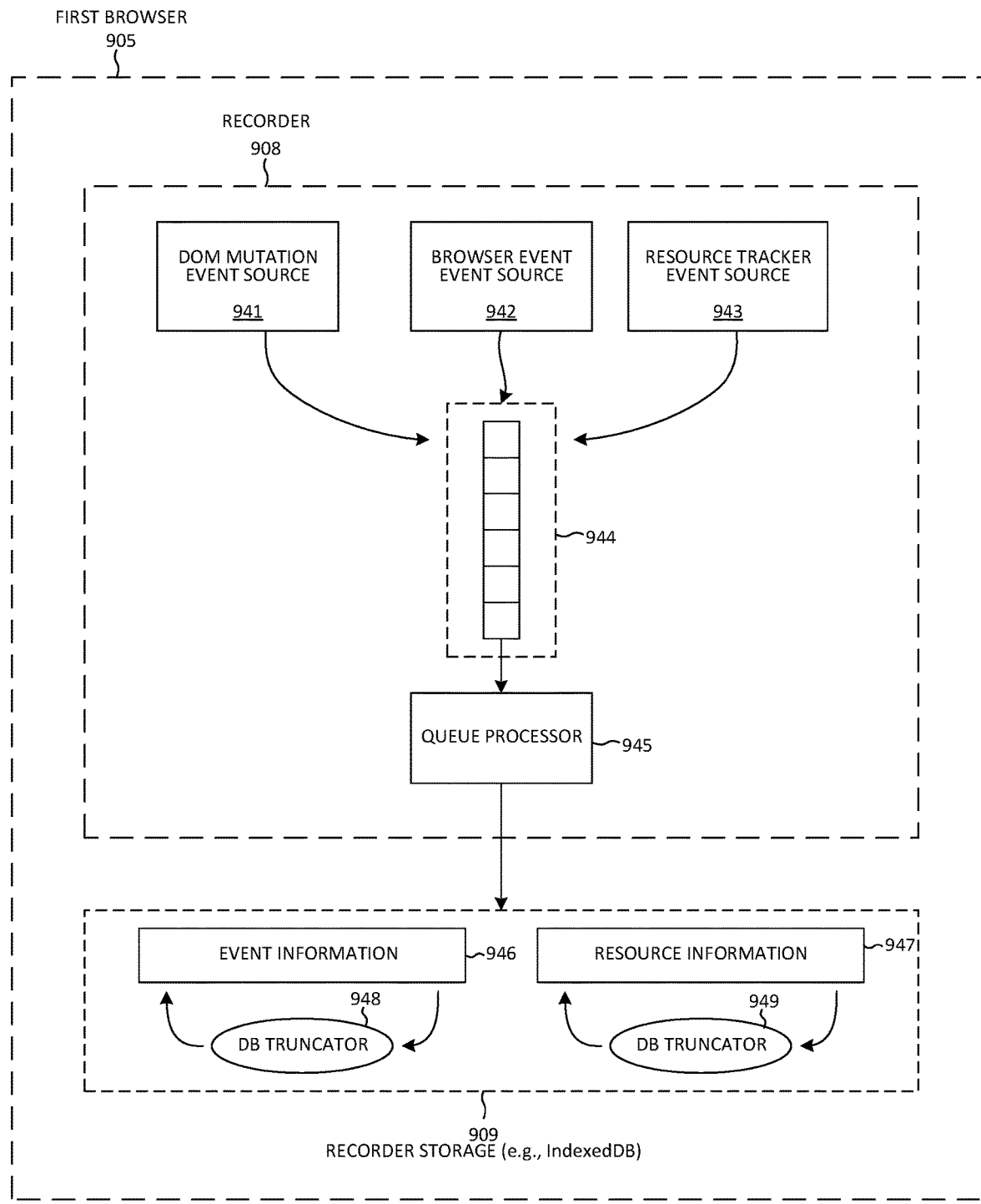
FIG. 11 is a detailed hardware diagram of the recorder mechanism and recorder storage of the first browser.

FIG. 11 is a detailed hardware diagram of the recorder mechanism 908 and recorder storage 909 of the first browser 902. The recorder 908 comprises a DOM mutation event source 941, a browser event source 942 and a resource tracker event source 943, a queuing structure 944, and a queue processor 945. The recorder storage 909 comprises event information 946, resource information 947, and database truncators 948 and 949.

In operation, the DOM mutation event source 941 detects DOM mutations during the session, the browser event source 942 detects browser events during the session, and the resource tracker event source 943 detects resource tracker events during the session. Each of the DOM mutation event source 941, the browser event source 942 and the resource tracker event source 943 supplies the detected information to the queuing structure 944. The queue processor 945 reads the information stored in the queuing structure 944 and stores the information in the recorder storage 909. The recorder storage 909 maintains event information 946 and resource information 947. The database truncators 948 and 949 manage space constraints and overwrite portions of memory storing older session information as newer session information is detected and stored in the recorder storage 909.

FIGS. 12A and 12B together form FIG. 12 which shows one embodiment of the DOM mutation event source mechanism 941 of the first browser 902.

FIG. 13 shows one embodiment of the browser event source mechanism 942 of the first browser 902.

FIG. 14 shows one embodiment of the resource tracker event source mechanism 943 of the first browser 902.

FIG. 15 shows one embodiment of the queue processor mechanism 944 of the first browser 902.

FIG. 16 shows one embodiment of the database truncator mechanism 945 of the first browser 902.

Figure 17:
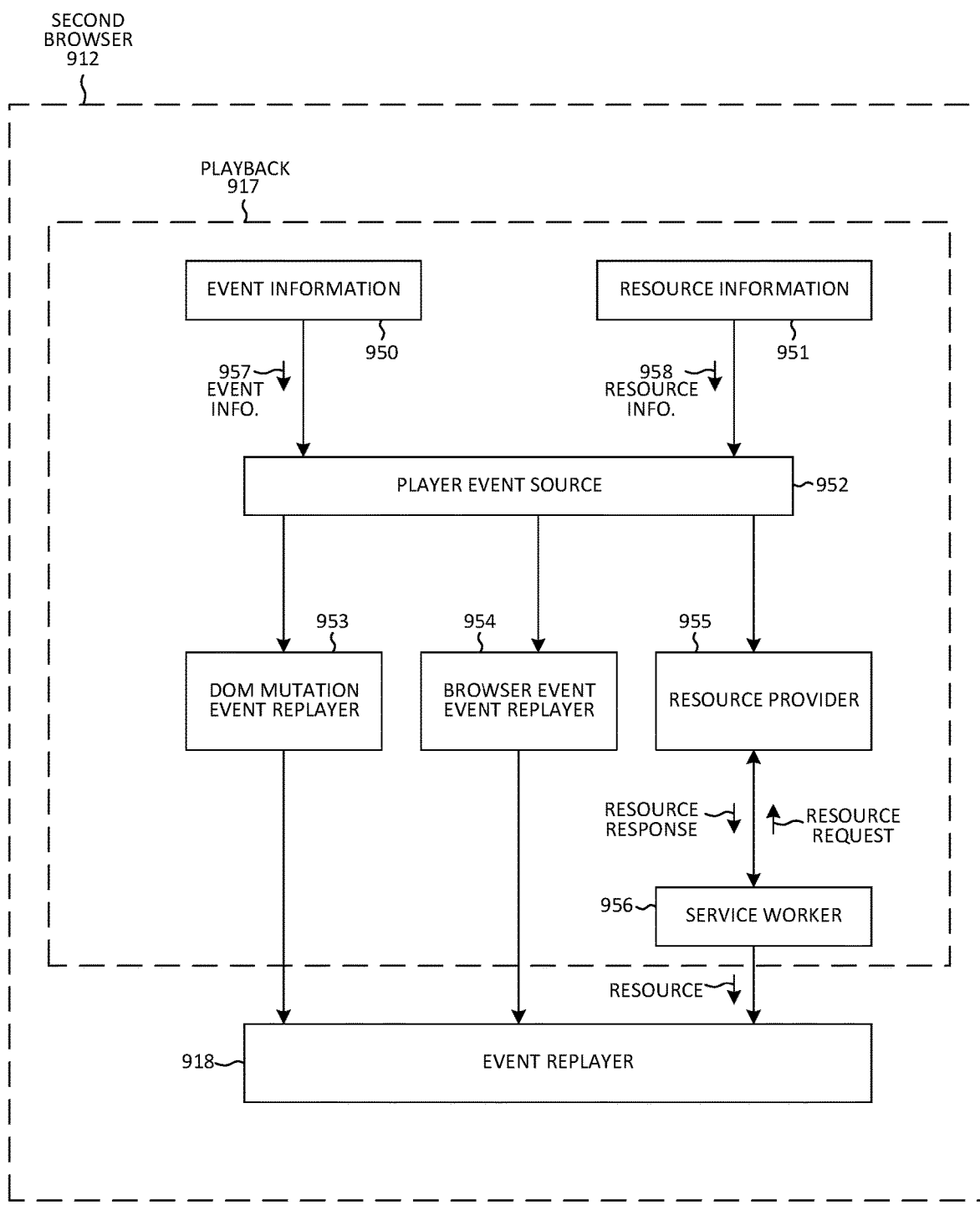
FIG. 17 is a detailed hardware diagram of the playback mechanism and event replayer of the second browser.

FIG. 17 is a detailed hardware diagram of the playback mechanism 915 and event replayer 916 of the second browser 912. The playback mechanism 915 obtains event information 950 and resource information 951 from the recording file 922. The event information 950 and the resource information 951 are received onto the player event source 952. From the event information 950 and the resource information 951, the player event source 952 supplies DOM mutation event information onto the DOM mutation event replayer 953, browser event information onto the browser event event replayer 954, and resource information 955 onto the resource provider 955. The event replayer 918 is configured to receive the DOM mutation event information and browser event information and replay the session on the second browser 912. During replaying of the session, resource requests are communicated to an interception mechanism such as the service worker 956. The service worker 956 operates as proxy and obtains resources from the resource provider 955 and communicates the obtained resources to the event replay 918. The event replayer 918 uses the resources to replay the session.

FIG. 18 shows one embodiment of the player event source mechanism 952 of the second browser 912.

FIG. 19 shows one embodiment of the browser event source mechanism 953 of the second browser 912.

FIG. 20 shows one embodiment of the browser event event replayer mechanism 954 of the second browser 912.

FIG. 21 shows one embodiment of the resource provider mechanism 955 of the second browser 912.

Figure 22:
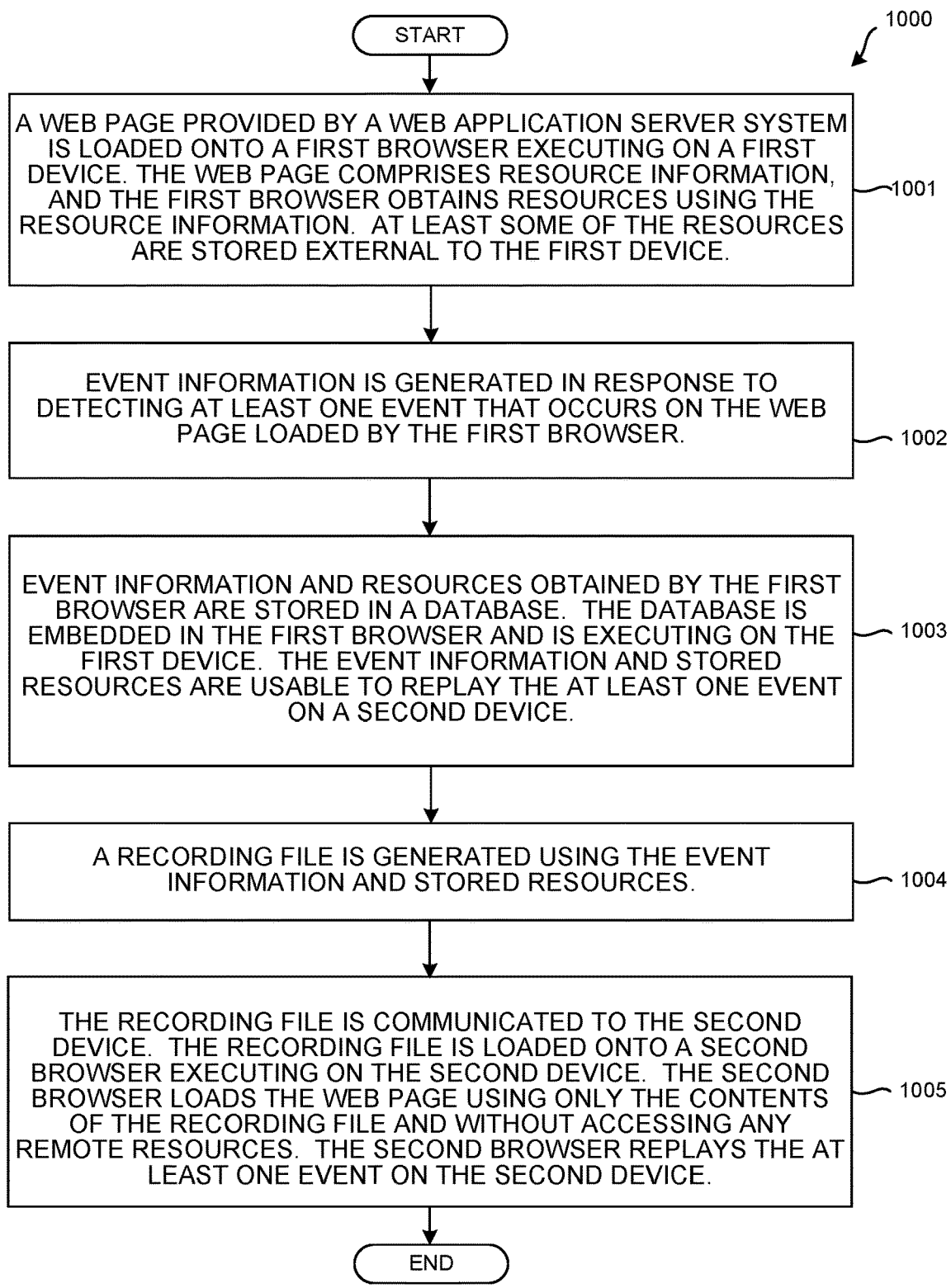
FIG. 22 is a flowchart of a method in accordance with at least one novel aspect.

FIG. 22 is a flowchart of a method 1000 in accordance with at least one novel aspect. In a first step (step 1001), a web page provided by a web application server system is loaded onto a first browser executing on a first device. The web page comprises resource information and the first browser obtains resources using the resource information. At least some of the resources are stored external to the first device.

In a second step (step 1002), event information is generated in response to detecting at least one event that occurs on the web page loaded by the first browser.

In a third step (step 1003), event information and resources obtained by the first browser are stored in a database. the database is embedded in the first browser and is executing on the first device. the event information and stored resources are usable to replay the events on a second device.

In a fourth step (step 1004), a recording file is generated using the event information and stored resources.

In a fifth step (step 1005), the recording file is communicated to the second device. The recording file is loaded onto a second browser executing on the second device. The second browser loads the web page using only the contents of the recording file and without accessing any remote resources. The second browser replays the events on the second device.

Figure 23:
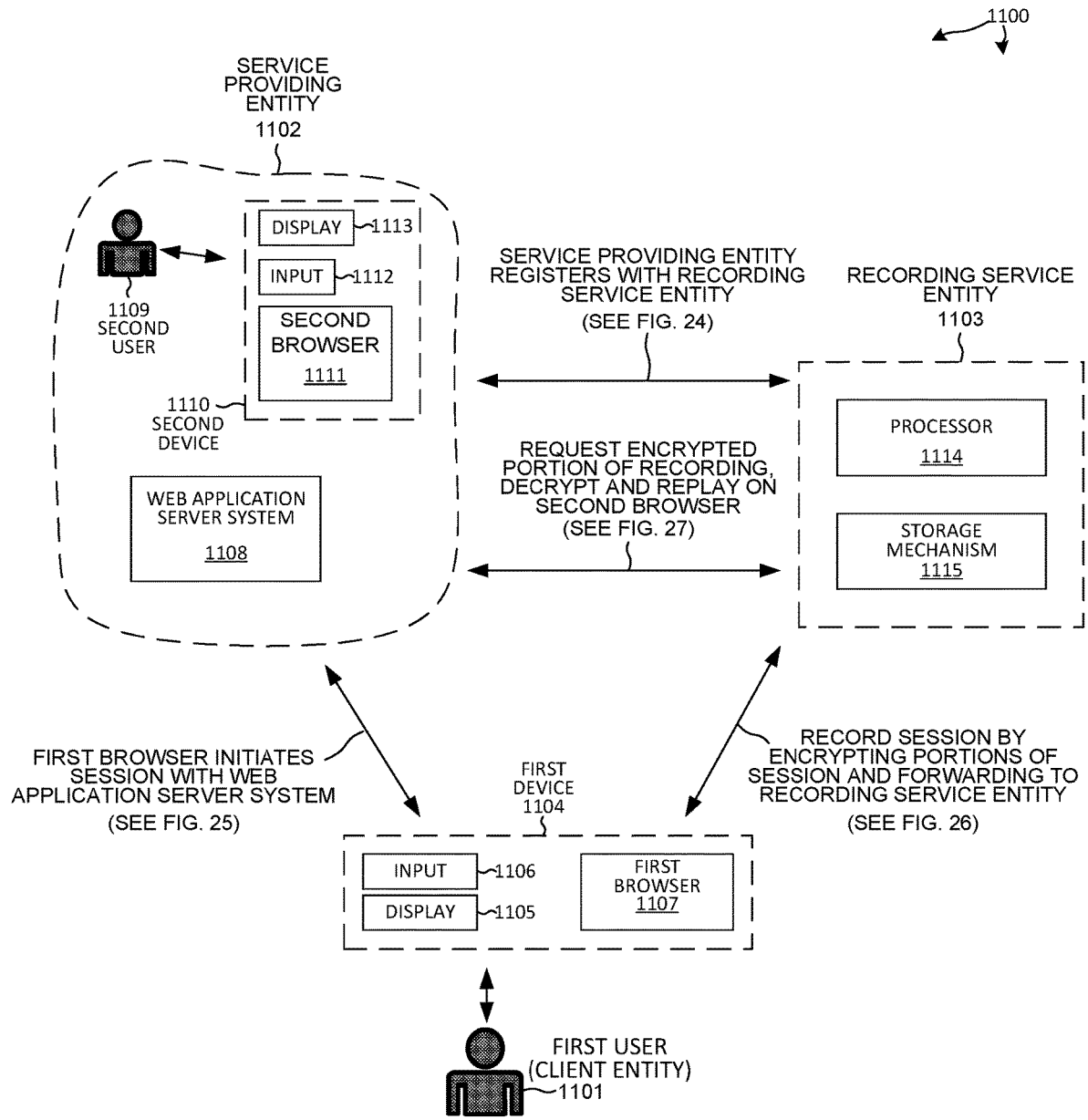
FIG. 23 is a diagram of a system having session information of a first device stored by a recording service entity where the session information is accessed by a service providing entity to replay a session in accordance with another embodiment.

FIG. 23 is a diagram of a system 1100 having session information of a first device 1104 stored by a recording service entity 1103 where the session information is accessed by a service providing entity 1102 to replay a session in accordance with another embodiment. System 1100 comprises the first device 1104 operated by a first user 1101, the service providing entity 1102, and the recording service entity 1103. The first device 1104 comprises an input 1106, display 1105, and a first browser 1107. The service providing entity 1102 comprises a web application server system 1108 and a second device 1110 that is operated by a second user 1109. The second device 1110 comprises a second browser on which sessions are replayed, an input 112, and a display 1113. The recording service entity 1103 comprises a processor 1114 and a storage mechanism 1115.

Figure 24:
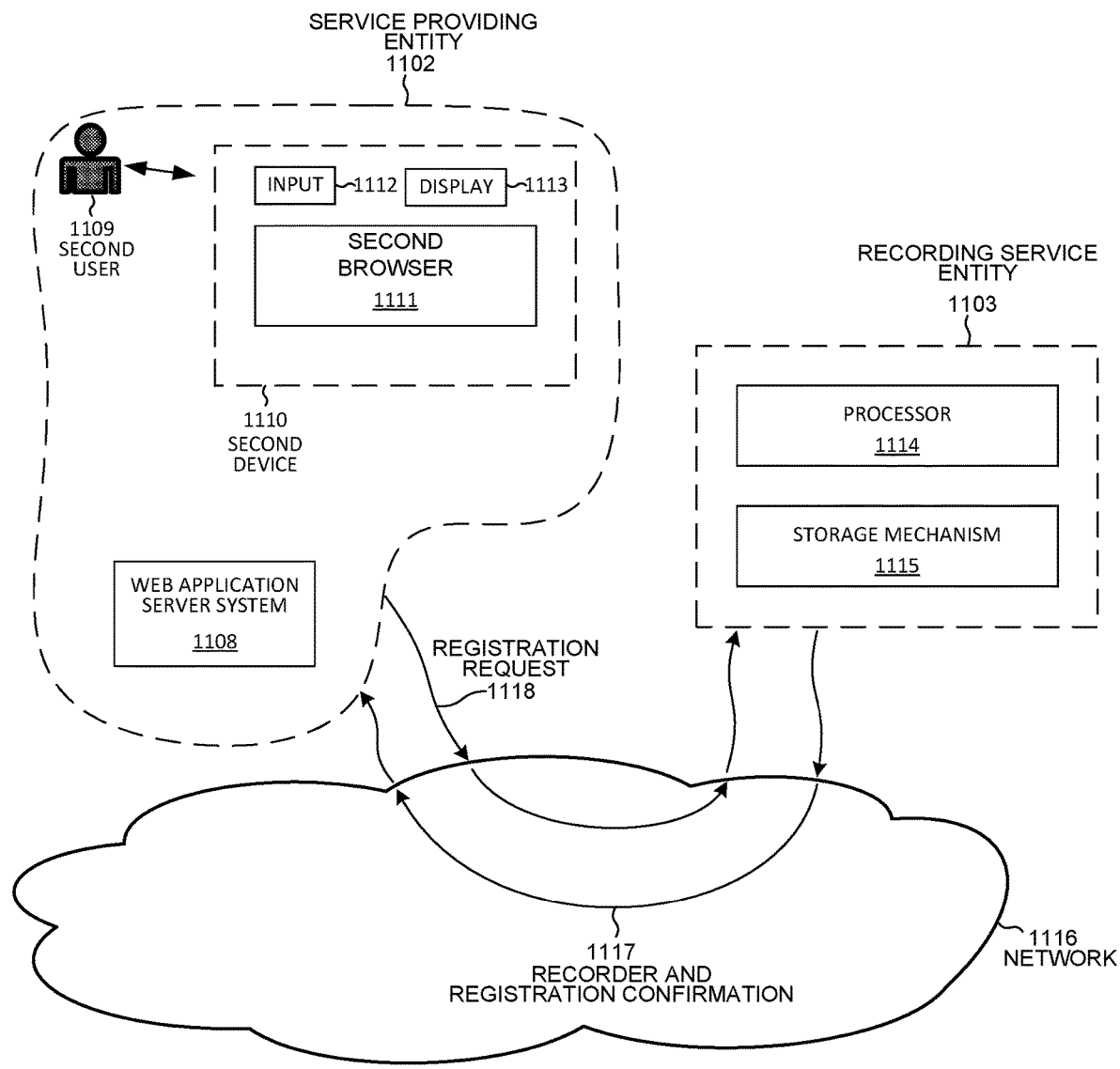
FIG. 24 is a diagram showing how a service providing entity registers with a recording service entity.

FIG. 24 is a diagram showing how a service providing entity 1102 registers with a recording service entity 1103. The service providing entity 1102 communicates a registration request 1118 to the recording service entity 1103 via a network 1116. The recording service entity 1103 registers the service providing entity 1102 and communicates a recorder and registration confirmation 1117 to the service providing entity 1102. Clients of the service providing entity 1102 that receive the recorder will have session information stored on the recording service entity 1103. The session information is accessible by the service providing entity 1102 to review sessions of clients. Communication of session information across the network 1116 is performed in accordance at least one of the encryption techniques described above.

Figure 25:
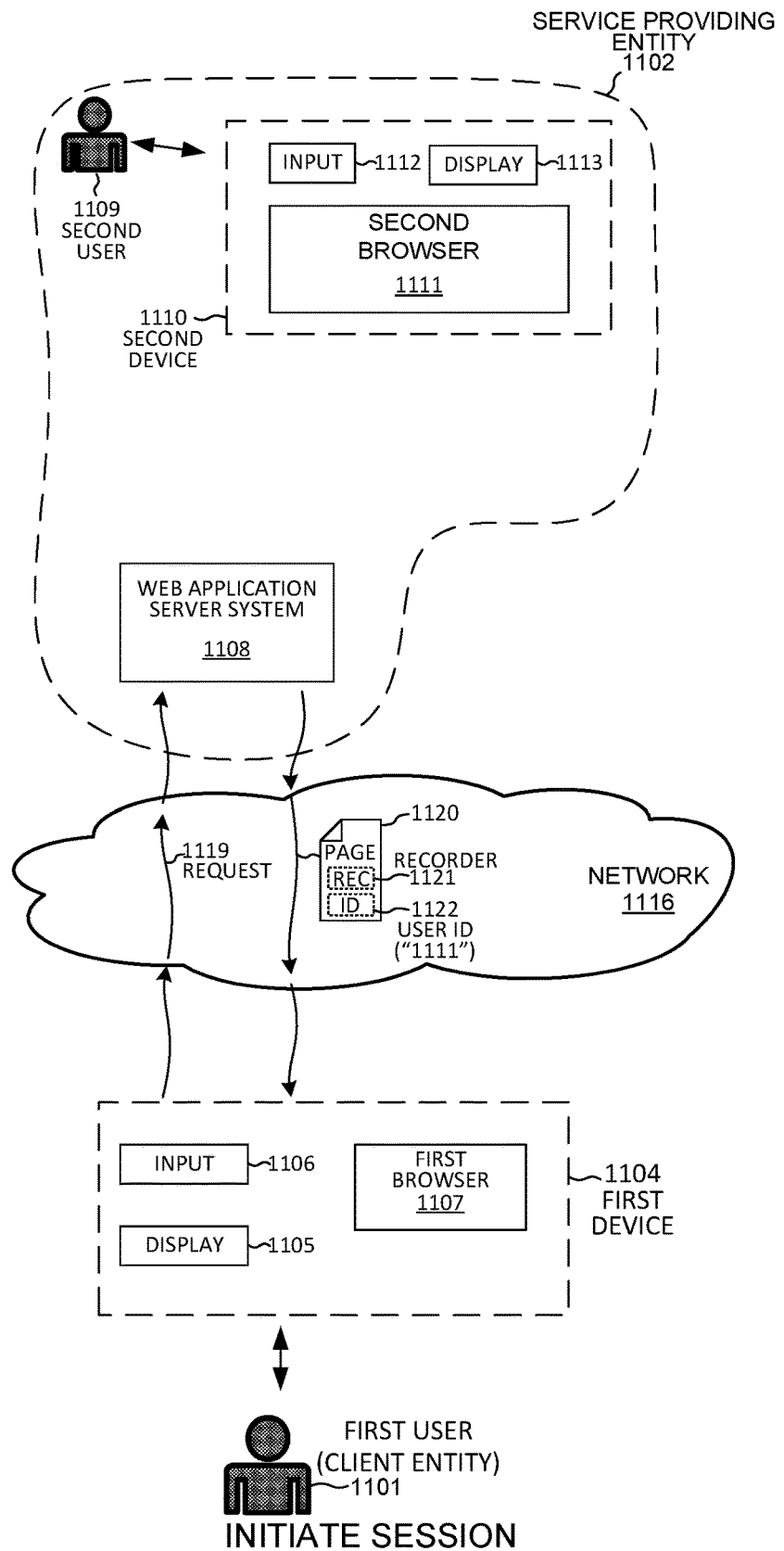
FIG. 25 is a diagram showing how the first user initiates a session with the service providing entity.

FIG. 25 is a diagram showing how the first user 1101 initiates a session with the service providing entity 1102. The first user 1101 accesses the service using the first browser 1107 causing the first browser 1107 to generate a request 1119 that is communicated to the web application server system 1108. The web application server system 1108 responds with a response 1120. The response 1120 includes a recorder 1121 and ID information 1122. In this example, the response is a web page 1120, the recorder 1121 is a script that is embedded in the web page 1120, and the ID information 1122 is embedded in the web page 1120.

Figure 26:
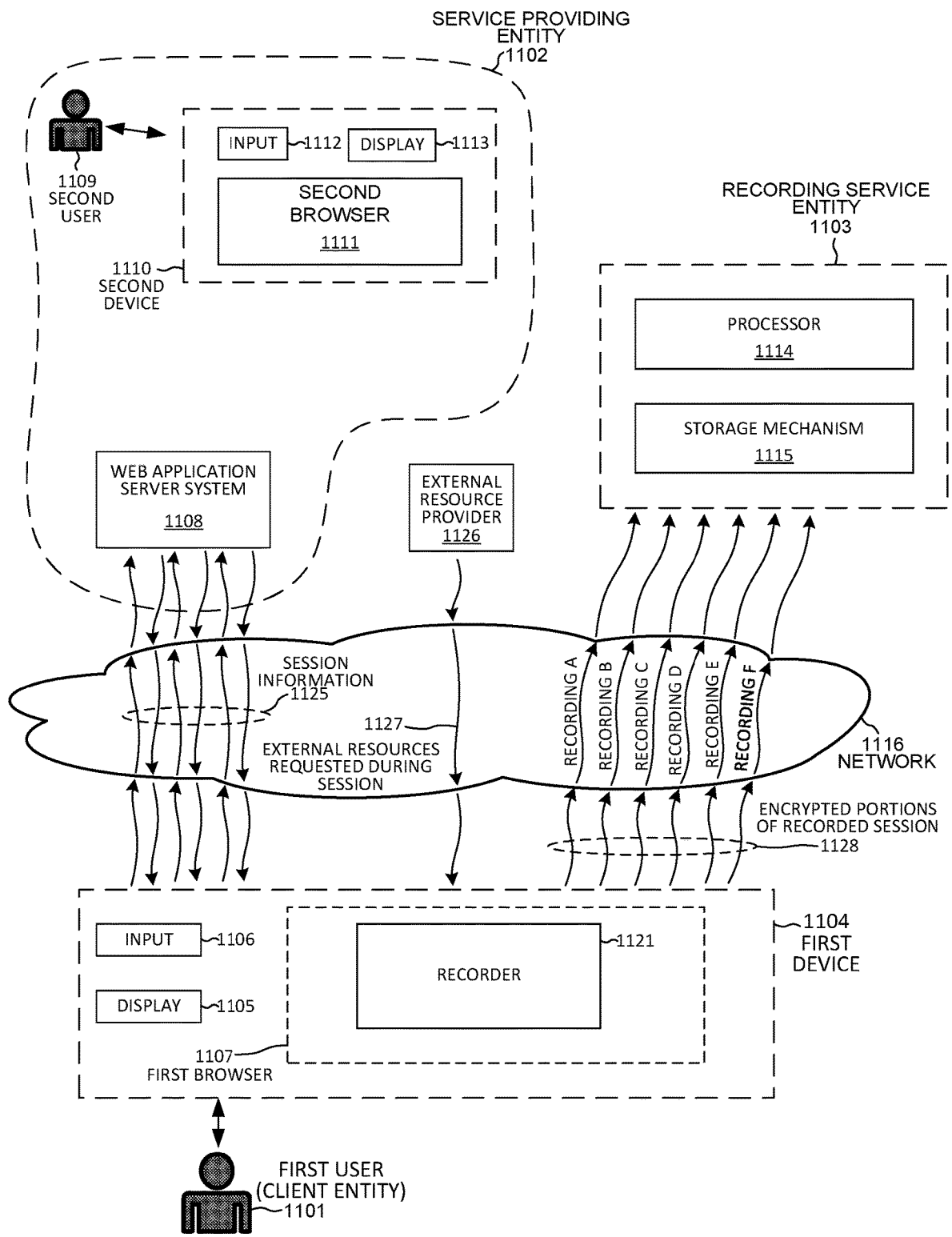
FIG. 26 is a diagram of that shows how a session on the first browser is recorded and encrypted in portions and forwarded to the recording service entity for storage.

FIG. 26 is a diagram of that shows how a session on the first browser 1107 is recorded and encrypted in portions and forwarded to the recording service entity 1103 for storage. The recorder 1121 is running on the first browser 1107. Session information 1125 and external resources 1127 provided by external resource provider 1126 are encrypted in portions by the recorder 1121. The recorder 1121 communicates the encrypted portions of the recorded session 1128 to the recording service entity 1103 via the network 1116. The processor 1114 stores the encrypted portions of the recorded session 1128 in the storage mechanism 1115.

Figure 27:
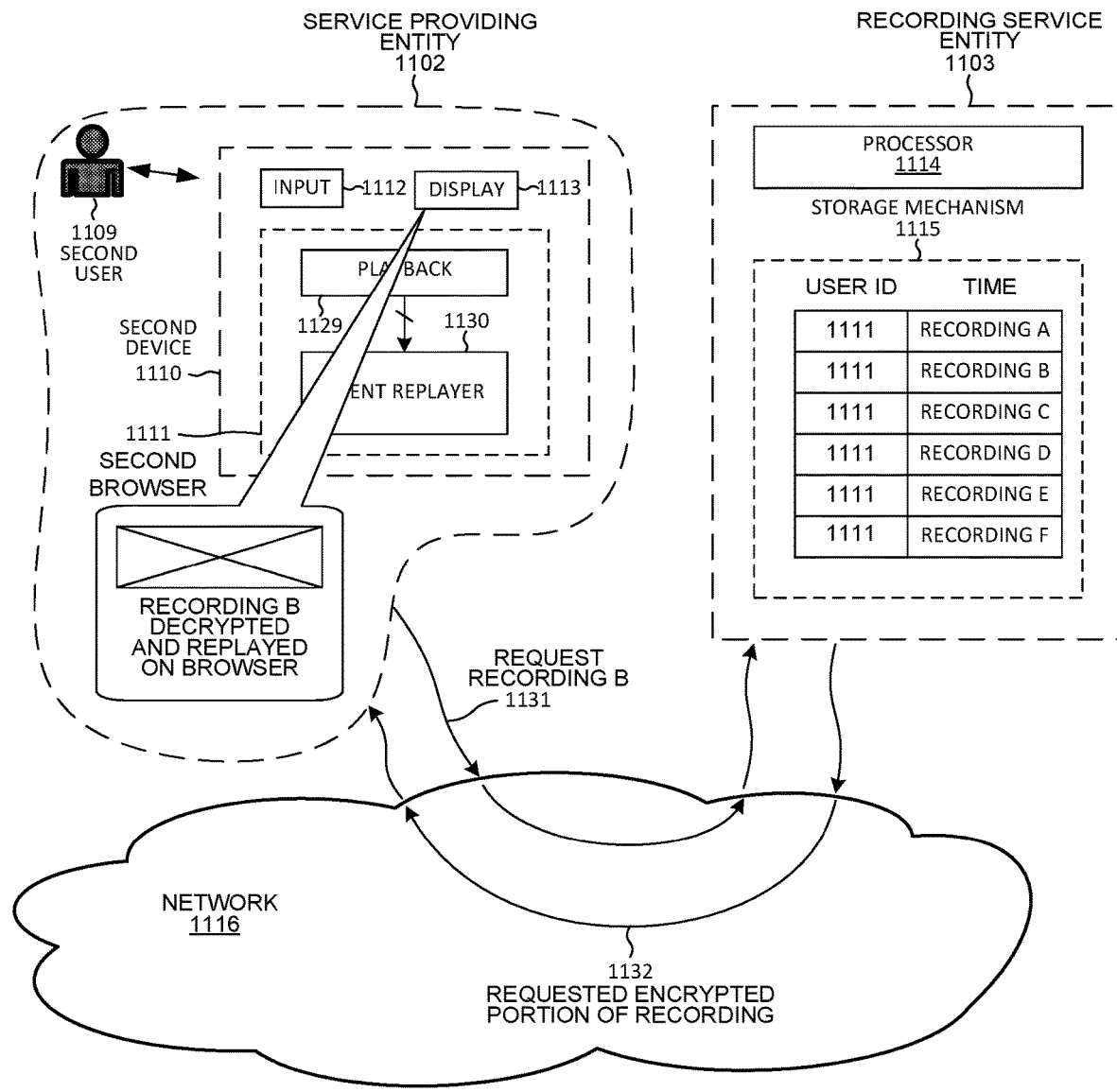
FIG. 27 is a diagram showing how the service providing entity obtains the encrypted portions of the recorded session from the recording service entity and replays the session.

FIG. 27 is a diagram showing how the service providing entity 1102 obtains the encrypted portions of the recorded session 1128 from the recording service entity 1103 and replays the session. The second user 1109 accesses the recording service entity 1103 via the second browser 1111 running on the second device 1110. The second browser 1111 comprises a playback mechanism 1129 and an event replayer 1130. The second user 1109 determines which of the portions of recorded session to obtain from the user identification information stored by the recording service entity 1103. Once determined, the second user 1109 communicates a request 1131 from the second browser 1111 to the recording service entity 1103 across network 1116. Processor 1114 receives request 1131, retrieves the requested portion of the recorded session 1132, and communicates the requested encrypted portion of the recorded session 1132 to the second browser 1111. The playback mechanism 1129 decrypts the encrypted portion of the recorded session 1132 to obtain session information and supplies the session information to the event replayer 1130. The event replayer 1130 replays the session on the second browser 1111 using session information.

Figure 28:
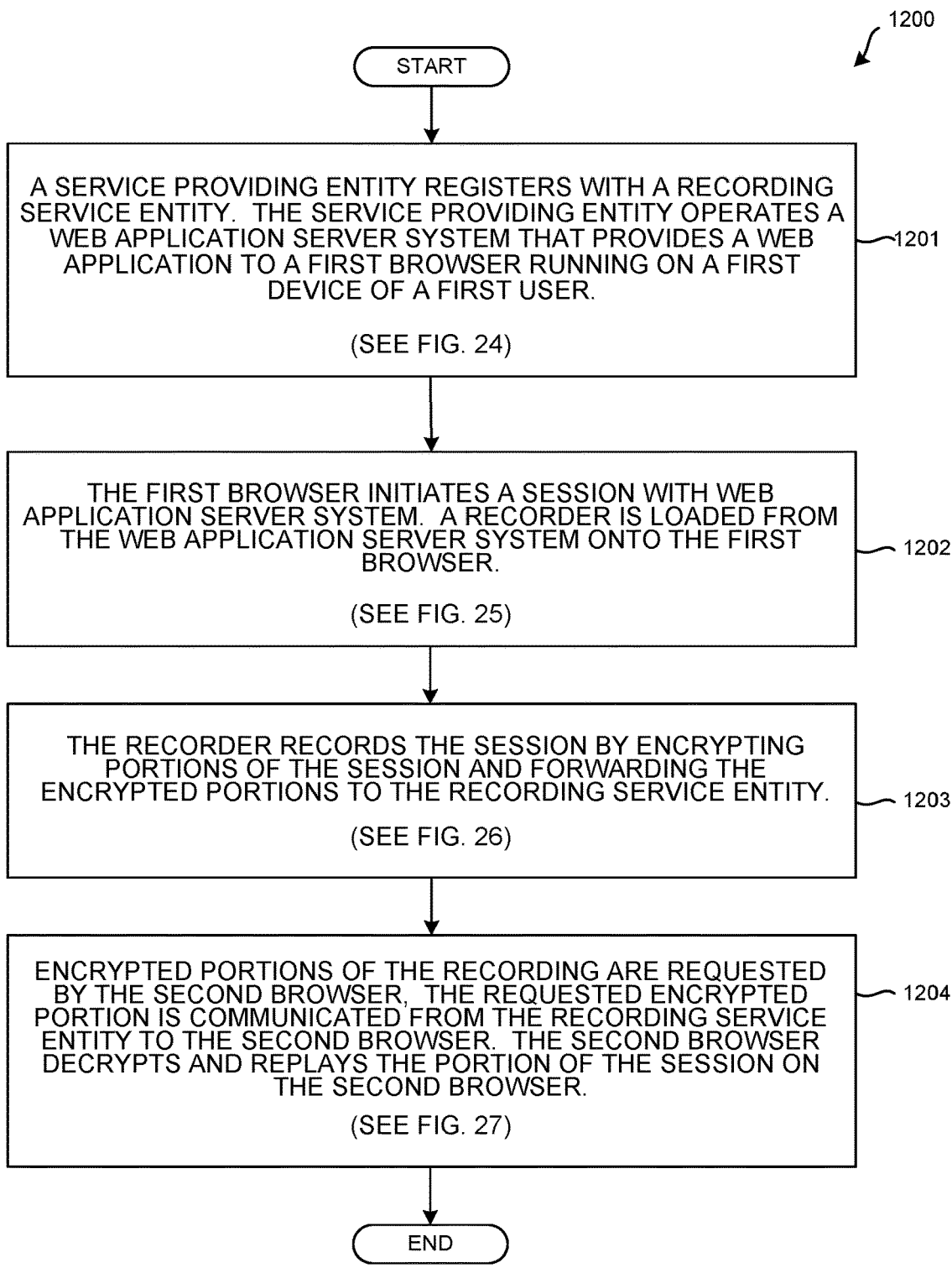
FIG. 28 is a flowchart of a method in accordance with another novel aspect.

FIG. 28 is a flowchart of a method 1200 in accordance with another novel aspect. In a first step (step 1201), a service providing entity registers with a recording service entity. The service providing entity operates a web application server system that provides a web application to a first browser running on a first device of a first user.

In a second step (1202), the first browser initiates a session with web application server system. A recorder is loaded from the web application server system onto the first browser.

In a third step (1203), the recorder records the session by encrypting portions of the session and forwarding the encrypted portions to the recording service entity.

In a fourth step (1204), the recorder records the session by encrypting portions of the session and forwarding the encrypted portions to the recording service entity.

Figure 29:
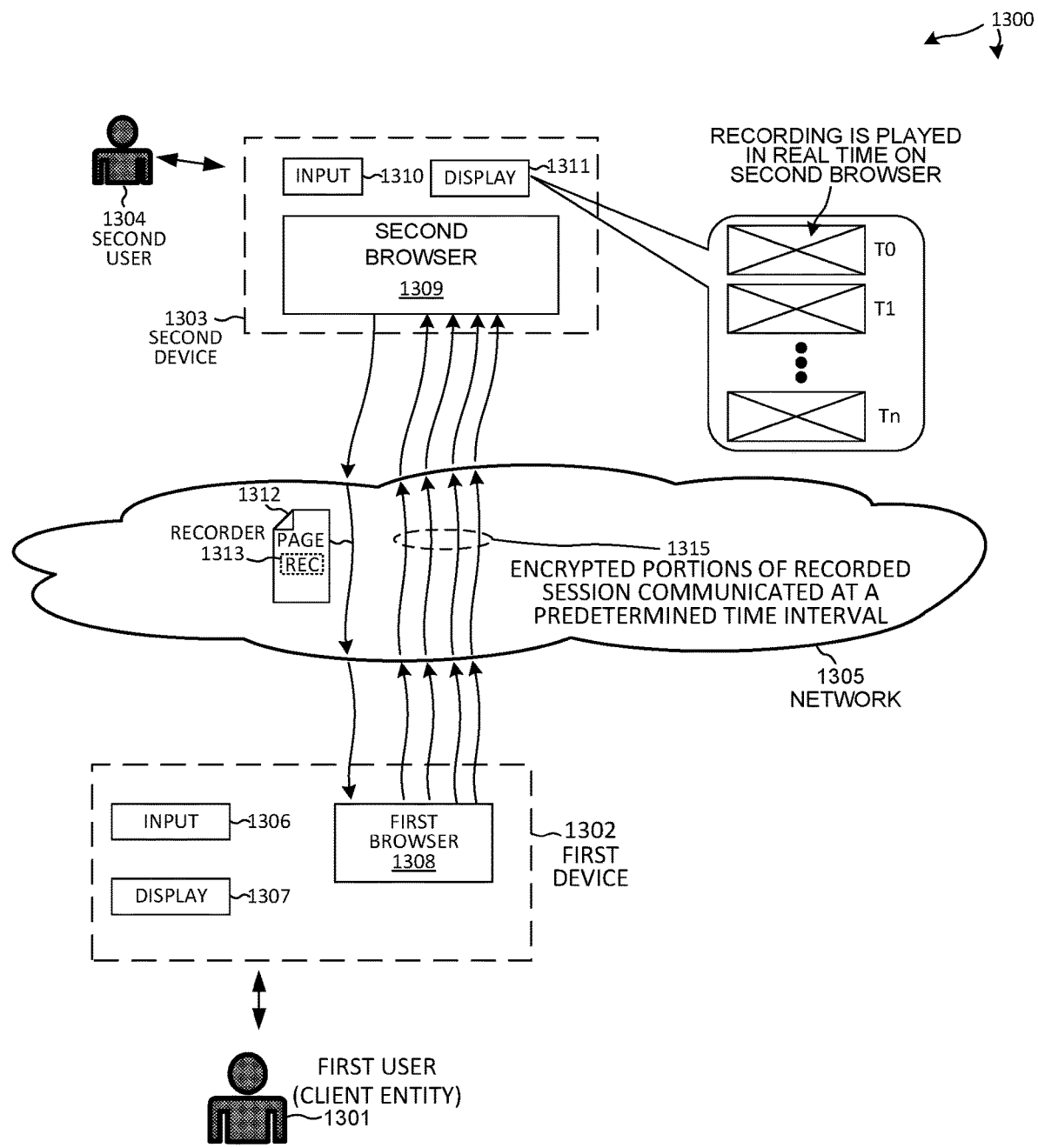
FIG. 29 is a diagram that shows how a recorder running on a first browser communicates a recorded session to a second browser in real time in accordance with another embodiment.

FIG. 29 is a diagram that shows how a recorder running on a first browser 1308 communicates a recorded session to a second browser 1309 in real time in accordance with another embodiment. A first device 1302 operated by a first user 1301 is to share session information in real time with a second device 1303 operated by a second user 1304. The first device 1302 comprises an input mechanism 1306, a display 1307, and a first browser 1308. The second device 1303 comprises an input mechanism 1310, a display 1311, and a second browser 1309. The second browser 1309 communicates a file 1132 comprising a recorder 1313 across network 1305. The recorder 1313 is loaded onto the first browser 1308. During a session initiated by the first user 1301 on the first browser, the recorded 1313 encrypts portions of a session and communicates portions of the encrypted session at a predetermined time interval to the second browser 1309. Reference numeral 1315 identifies these encrypted portions of the session that are communicated in real time to the second browser 1309. The second browser 1309 presents the session to the second user 1304 in real time on the display 1311.

Figure 30:
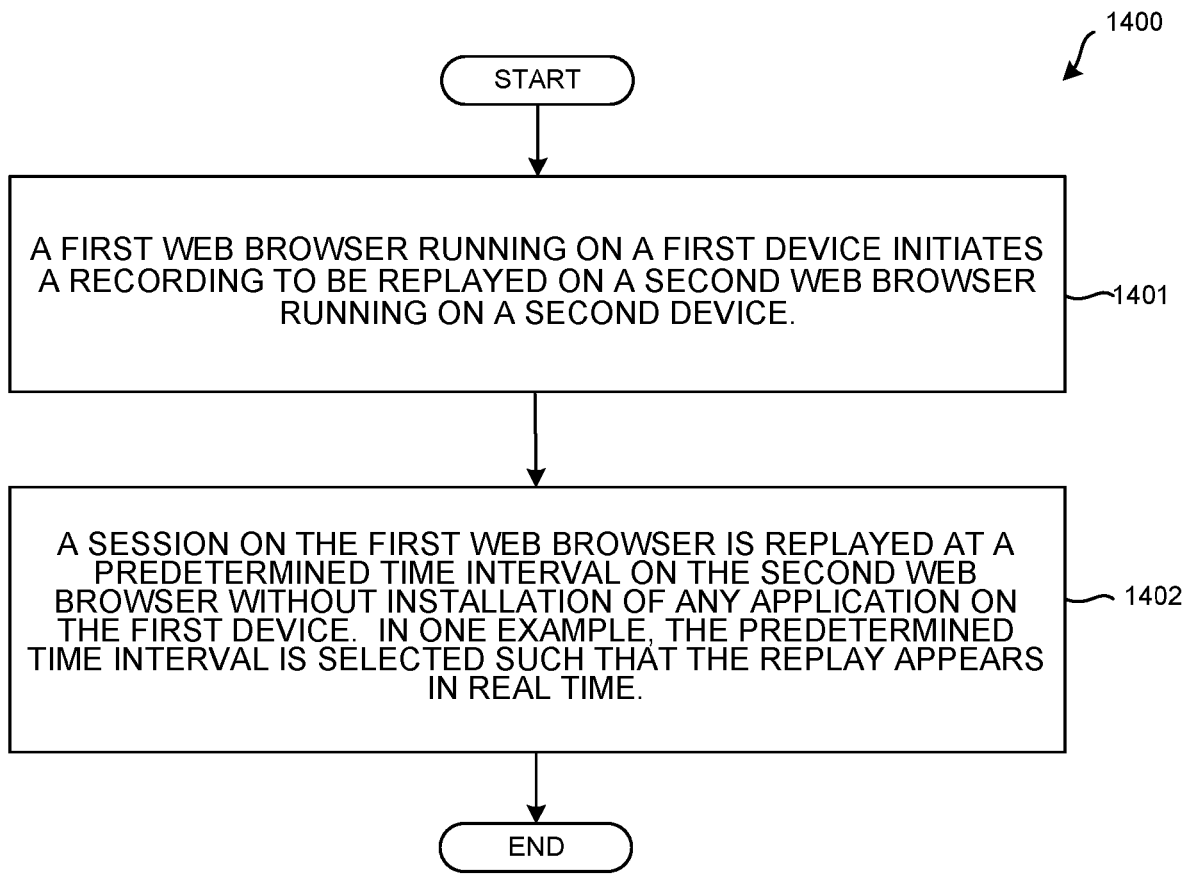
FIG. 30 is a flowchart of a method in accordance with another novel aspect.

FIG. 30 is a flowchart of a method 1400 in accordance with another novel aspect. In a first step (1401), a first web browser running on a first device initiates a recording to be replayed on a second web browser running on a second device.

In a second step (1402), a session on the first web browser is replayed at a predetermined time interval on the second web browser without installation of any application on the first device. In one example, the predetermined time interval is selected such that the replay appears in real time.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
   capturing and storing a recording of at least one user session of a web page or a web application in a first web browser of a user device, wherein before storage in the first web browser, the recording is encrypted using a public key of an asymmetric encryption key pair such that the recording is indecipherable to a user using the first web browser;
   transferring the recording to a second web browser;
   using a private key of the asymmetric encryption key pair to decrypt the recording in the second browser; and
   replaying the recording in the second web browser to reproduce at least one state of the web page or web application as recorded during the user session, wherein some or all information involved in the replaying is contained in the recording, wherein the user does not have access to the private key, wherein the recording is not decipherable by the user, and wherein the user cannot replay the recording.

2. The method of claim 1, wherein the recording is self-contained such that the recording is replayable within an isolated system without access to external resources and replayable even if information provided by an original source of the web page or web application changes or is removed.

3. The method of claim 1, wherein the web page is a static web page that is immutable, wherein the web application dynamically provides web pages that are mutable and interactive, wherein the first and second web browsers are software applications used to access markup documents, wherein the recording occurs with or without installing or downloading any other applications or browser extensions, and wherein the replaying occurs without installing or downloading any other applications or browser extensions.

4. The method of claim 1, wherein a recorder running in the first browser runs continuously and truncates old data at certain intervals thereby maintaining space requirements on the first browser bounded.

5. The method of claim 1, wherein linked resources referenced by the web page or web application during the user's session, including images and CSS files, are captured and stored in the recording embedded as data URIs.

6. The method of claim 1, wherein linked resources referenced by the web page or web application during the user's session, including images and CSS files, are captured and stored in the recording, their invocation during replay on the second browser trapped using an interception mechanism which reads their content from the recording and serves their stored copy or an error without requiring access to an original source or proxying the request to the original source, including any web servers, and wherein the original source is where the resource was accessed from in the first web browser during the user session.

7. The method of claim 1, wherein the recording comprises a redacted version of the user sessions, wherein the redacted version redacts part or all of non-layout content of the user sessions such that a layout of the webpage or web application is recognizably maintained, wherein the redacted version is generated by removing textual content and replacing the textual content with randomly generated or unrelated textual content, and wherein the redacted version is generated before storing on the first web browser, before transferring, or before replaying.

8. The method of claim 1, wherein the recording comprises a redacted version of the user sessions, wherein the redacted version redacts part or all of non-layout content of the user sessions such that a layout of the webpage or web application is recognizably maintained, wherein the redacted version is generated by obfuscating content by blurring, pixelation, or a combination of blurring and pixelation, and wherein the redacted version is generated before storing on the first web browser, before transferring, or before replaying.

9. A method comprising:
(a) capturing a recording of a user session of a web page or web application in a first web browser of a user;
(b) encrypting and storing the recording on a storage medium accessible to an entity lacking the ability to decrypt the recording, wherein the encryption is done using a public key of an asymmetric encryption key pair;
(c) transferring the encrypted recording to a second web browser; and
(d) replaying the user session in the second web browser after decrypting the recording to reproduce at least one state of the web page or web application as recorded during the user session, wherein the decryption is done using a private key of the asymmetric encryption key pair, wherein the user does not have access to the private key, wherein the recording is not decipherable by the user, and wherein the user cannot replay the recording, and wherein the replaying is performed without requiring access to any external resource such that the replaying is performed entirely or partially from the recording.

10. The method of claim 9, wherein the recording comprises a redacted version of the user session, wherein the redacted version redacts part or all of non-layout content of the user session such that a layout of the webpage or web application is recognizably maintained, wherein the redacted version is generated by removing textual content and replacing the textual content with randomly generated or unrelated textual content, and wherein the redacted version is generated before storing on the first web browser, before transferring, or before replaying.

11. The method of claim 9, wherein the recording comprises a redacted version of the user session, wherein the redacted version redacts part or all of non-layout content of the user session such that a layout of the webpage or web application is recognizably maintained, wherein the redacted version is generated by obfuscating content by blurring content, pixelating content, or by both blurring and pixelating content, and wherein the redacted version is generated before transferring or before replaying.

12. A method comprising:
capturing a recording of at least one user session of a user on a web page or a web application in a first web browser of a user device;
establishing a data transfer channel between the first web browser and the second web browser and transferring an encrypted version of the recording over the data transfer channel, wherein the recording is encrypted using a public key of an asymmetric encryption key pair; and
replaying the recording in the second web browser to reproduce at least one state of the web page or web application as recorded during the user session, wherein the encrypted version of the recording is decrypted using a private key of the asymmetric encryption key pair, wherein the user does not have access to the private key, wherein the recording is not decipherable by the user, wherein the user cannot replay the recording, and wherein some or all information involved in the replaying is contained in the recording.

13. The method of claim 12, wherein replaying occurs in real time without any delay other than that due to: processing time associated with the first web browser, delay due to transmission over the data transfer channel, or processing time associated with the second web browser.

14. The method of claim 12, wherein the data transfer channel is bi-directional and is used to exchange messages between the users using the two browsers including textual messages and on-screen drawing using a pointer device, and wherein transfer of the recording file in real time involves encrypting and transferring recordings of the session periodically within a predetermined time interval.

15. The method of claim 12, wherein the recording includes a redacted version of the user session, wherein the redacted version redacts part or all of non-layout content of the user sessions such that a layout of the webpage or web application is recognizably maintained, wherein the redacted version is generated by obfuscating content, by removing and replacing content, or by a combination of both obfuscating content and removing and replacing content, and wherein the redacted version is generated before transferring or before replaying.

* * * * *